US012311212B2

(12) United States Patent
Piech et al.

(10) Patent No.: US 12,311,212 B2
(45) **Date of Patent: *May 27, 2025**

(54) FIRE SUPPRESSION SYSTEM REMOTE MONITORING

(71) Applicant: Carrier Corporation, Palm Beach Gardens, FL (US)

(72) Inventors: Marcin Piech, East Hampton, CT (US); May L Corn, West Hartford, CT (US); Joseph William Ciol, West Dennis, MA (US); Peter R. Harris, Jupiter, FL (US); Mohammed Z. Ateeq, Shrewsbury, MA (US); Abhay Balabhim Nadgir, Southborough, MA (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,966

(22) Filed: Nov. 18, 2022

(65) Prior Publication Data

US 2023/0083138 A1 Mar. 16, 2023

Related U.S. Application Data

(63) Continuation of application No. 17/252,021, filed as application No. PCT/US2019/051665 on Sep. 18, 2019, now Pat. No. 11,648,431.

(Continued)

(51) Int. Cl.

| | |
|---|---|
| ***A62C 37/50*** | (2006.01) |
| ***A62C 35/02*** | (2006.01) |
| ***A62C 37/40*** | (2006.01) |

(52) U.S. Cl.
CPC ............ *A62C 37/50* (2013.01); *A62C 35/023* (2013.01); *A62C 37/40* (2013.01)

(58) Field of Classification Search
CPC ........ A62C 37/50; A62C 35/023; A62C 37/40
See application file for complete search history.

(56) References Cited

U.S. PATENT DOCUMENTS 4,363,424 A * 12/1982 Holben ................ F17C 13/002 222/4
6,598,454 B2 7/2003 Brazier et al.

(Continued)

FOREIGN PATENT DOCUMENTS

CN 101660663 A 3/2010
CN 102125741 A 7/2011

(Continued)

OTHER PUBLICATIONS

International Search Report and Written Opinion dated Nov. 28, 2019 for PCT/US2019/051665.

(Continued)

*Primary Examiner* — Joseph A Greenlund
(74) *Attorney, Agent, or Firm* — Honigman LLP

(57) ABSTRACT

A fire suppression system has a plurality of tank units (40, 42, 44, 46) each having: a tank body having a first port and an interior for storing at least one of fire suppressant and driver gas; a discharge assembly mounted to the first port and comprising: a discharge valve (50, 52); and a first monitoring switch or sensor (230; 240). A first monitoring unit (100) is coupled to the first monitoring switch or sensor of each said tank unit and configured to communicate with a remote monitoring location. For each of the tank units there is: a second monitoring switch or sensor (260, 280, 290); and a second monitoring unit (340) coupled to said (Continued)

second monitoring switch or sensor and configured to communicate with the remote monitoring location.

21 Claims, 18 Drawing Sheets

Related U.S. Application Data

(60) Provisional application No. 62/773,450, filed on Nov. 30, 2018.

(56) References Cited

U.S. PATENT DOCUMENTS

| | | | | |
|---|---|---|---|---|
| 7,081,815 | B2 * | 7/2006 | Runyon | E05G 1/10 340/572.8 |
| 7,126,465 | B2 * | 10/2006 | Faltesek | G08B 25/14 340/3.1 |
| 7,174,769 | B2 * | 2/2007 | McSheffrey, Jr. | G08B 25/10 73/37 |
| 7,218,237 | B2 | 5/2007 | Kates | |
| 7,227,450 | B2 | 6/2007 | Garvy et al. | |
| 7,360,413 | B2 | 4/2008 | Jeffries et al. | |
| 7,383,892 | B2 * | 6/2008 | Jackson | A62C 35/00 239/69 |
| 7,561,057 | B2 | 7/2009 | Kates | |
| 7,900,647 | B2 | 3/2011 | Tornay | |
| 7,921,577 | B2 | 4/2011 | Reilly et al. | |
| 8,297,370 | B2 | 10/2012 | Wilkins et al. | |
| 8,350,691 | B2 | 1/2013 | McFarland | |
| 8,561,636 | B2 | 10/2013 | Eithun | |
| 8,573,315 | B1 | 11/2013 | Taylor | |
| 8,720,481 | B2 | 5/2014 | Guy | |
| 8,720,591 | B2 * | 5/2014 | Burkhart | A62C 35/645 169/17 |
| 8,749,373 | B2 * | 6/2014 | McSheffrey | G01F 23/18 342/27 |
| 8,842,016 | B1 | 9/2014 | Cazanas et al. | |
| 8,981,927 | B2 | 3/2015 | McSheffrey | |
| 9,033,061 | B2 * | 5/2015 | Chattaway | A62C 3/08 169/56 |
| 9,095,736 | B2 * | 8/2015 | Kochelek | G01M 3/2853 |
| 9,144,700 | B2 * | 9/2015 | Burkhart | A62C 35/64 |
| 9,383,289 | B1 * | 7/2016 | Meyer | G08B 25/14 |
| 9,463,344 | B2 * | 10/2016 | Fazzio | G01L 7/06 |
| 9,541,625 | B2 | 1/2017 | McSheffrey | |
| 9,619,996 | B1 * | 4/2017 | Smith | G08B 27/001 |
| 10,213,635 | B2 * | 2/2019 | Baxendell | A62C 35/68 |
| 2005/0056090 | A1 * | 3/2005 | McSheffrey | G01F 23/804 73/314 |
| 2009/0237239 | A1 * | 9/2009 | McSheffrey | G08B 17/00 340/539.24 |
| 2011/0168416 | A1 | 7/2011 | Frasure et al. | |
| 2011/0308638 | A1 * | 12/2011 | Hyland | G01D 4/004 137/299 |
| 2012/0073839 | A1 * | 3/2012 | Thomas, III | A62C 13/76 169/30 |
| 2012/0188076 | A1 * | 7/2012 | McSheffrey | F17C 13/02 340/539.17 |
| 2012/0255345 | A1 | 10/2012 | Golinveaux et al. | |
| 2012/0317780 | A1 | 12/2012 | Malinen | |
| 2014/0157890 | A1 * | 6/2014 | Malinen | G01F 23/14 73/299 |
| 2015/0041158 | A1 * | 2/2015 | Stumm | A62C 37/10 169/19 |
| 2015/0160663 | A1 | 6/2015 | McCarthy, III et al. | |
| 2015/0297925 | A1 | 10/2015 | Nikkarila et al. | |
| 2016/0096053 | A1 | 4/2016 | Beechy et al. | |
| 2016/0263410 | A1 * | 9/2016 | Enk, Sr. | A62C 99/0036 |
| 2017/0014655 | A1 | 1/2017 | Gatsonides et al. | |
| 2017/0100617 | A1 * | 4/2017 | Kochelek | A62C 37/50 |
| 2017/0209725 | A1 * | 7/2017 | Hu | A62C 13/76 |
| 2018/0169451 | A1 * | 6/2018 | Moffa | A62C 37/50 |
| 2019/0209880 | A1 * | 7/2019 | Deyoung | A62C 37/11 |
| 2019/0224509 | A1 * | 7/2019 | Goyette | A62C 35/62 |
| 2019/0224512 | A1 * | 7/2019 | Goyette | A62C 3/004 |
| 2019/0374803 | A1 * | 12/2019 | Ryczek | A62C 35/023 |
| 2020/0097904 | A1 * | 3/2020 | Skaaksrud | B64D 45/00 |
| 2020/0197735 | A1 * | 6/2020 | Li | A62C 37/44 |
| 2021/0268322 | A1 * | 9/2021 | Thomas | A62C 35/68 |
| 2021/0283446 | A1 * | 9/2021 | Piech | A62C 35/023 |
| 2021/0361991 | A1 * | 11/2021 | Piech | A62C 3/00 |
| 2021/0364335 | A1 * | 11/2021 | Piech | G01F 23/20 |

FOREIGN PATENT DOCUMENTS

| | | | |
|---|---|---|---|
| CN | 102711924 | A | 10/2012 |
| CN | 103354759 | A | 10/2013 |
| CN | 103759893 | A | 4/2014 |
| CN | 203989652 | U | 12/2014 |
| CN | 104399220 | A | 3/2015 |
| CN | 104492019 | A | 4/2015 |
| CN | 104826262 | A | 8/2015 |
| CN | 105025988 | A | 11/2015 |
| CN | 106345089 | A | 1/2017 |
| CN | 108064183 | A | 5/2018 |
| EP | 2687269 | A1 | 1/2014 |
| JP | 02220673 | A | 9/1990 |
| KR | 20170043205 | A | 4/2017 |
| TW | 201714639 | A | 5/2017 |
| WO | 2010/035150 | A1 | 4/2010 |
| WO | 2012/091721 | A1 | 7/2012 |
| WO | 2015/015227 | A1 | 2/2015 |
| WO | 2016/196104 | A1 | 12/2016 |
| WO | 2016/200608 | A1 | 12/2016 |
| WO | 2018112385 | A2 | 6/2018 |

OTHER PUBLICATIONS

Chinese Office Action dated Apr. 1, 2022 for Chinese Patent Application No. 201980041195.5.

Chinese Office Action dated Oct. 14, 2022 for Chinese Patent Application No. 201980041195.5.

US Office Action dated May 5, 2022 for U.S. Appl. No. 17/252,021.

Notice of Allowance dated Aug. 24, 2022 for U.S. Appl. No. 17/252,021.

European Office Action dated Nov. 7, 2023 for European Patent Application No. 19779699.8.

* cited by examiner

FIRE SUPPRESSION SYSTEM REMOTE MONITORING

CROSS-REFERENCE TO RELATED APPLICATION

This is a continuation application of U.S. patent application Ser. No. 17/252,021 and entitled "Fire Suppression System Remote Monitoring", which is a 371 US national stage application of PCT/US2019/051665, filed Sep. 18, 2019, which claims benefit of U.S. Patent Application No. 62/773,450, filed Nov. 30, 2018, and entitled "Fire Suppression System Remote Monitoring", the disclosures of which are incorporated by reference herein in their entireties as if set forth at length.

BACKGROUND

The disclosure relates to fire suppression. More particularly, the disclosure relates to monitoring of fire suppressant storage tanks.

Liquid fire suppression agents have been used for decades. Although some agents such as hydrofluorocarbon (HFC) (e.g. Halon 1301 (bromotrifluoromethane) and HFC-227ea (heptafluoropropane)) are in disfavor due to environmental concerns, replacements are readily commercially available, such as a fluoroketone formulated as dodecafluoro-2-methylpentan-3-one (1,1,1,2,2,4,5,5,5-nonafluoro-4-(trifluoromethyl)-3-pentanone) ($CF_3CF_2C(O)CF(CF_3)_2$) (ASHRAE nomenclature FK-5-1-12). Such agents are typically used with a pressurant/propellant such as $N_2$. Kidde-Fenwal, Inc. of Ashland, Massachusetts manufactures an exemplary fire suppression system, the Kidde® ADS™. Other suppressant agents and pressurant/propellants may be used in fire suppression systems as necessary to meet desired fire suppression capabilities.

Typically such agents are stored as a liquid in one or more metal tanks (e.g., steel tanks having a cylindrical centerbody and domed ends, although other shapes and materials are also known in the art). A tank is typically positioned with its axis vertical so that one end is an upper end or top and the other a lower end or base. The upper end typically has a number of ports with fittings (e.g., threaded fittings). Typically a large center port receives a discharge assembly. The discharge assembly may include a fitting portion mated to the tank fitting and an external valve (e.g., automatically controllable via a control system). A discharge conduit (also known as a siphon tube or dip tube) extends downward into the tank and typically has an open lower end near the bottom of the tank. In facility configurations requiring multiple tanks, the tanks may be connected to a suppression system serially, independently, or in distributed locations in different configurations, and may be co-located or distributed throughout a facility. The suppression system includes piping from the tank(s) to endpoints such as discharge nozzles. Various pressure regulators and controllable valves may be located along the piping to provide selective discharge of suppressants at locations of fire.

Due to their low heat of evaporation and high vapor pressure (e.g., relative to water), typical liquid fire suppression agents will rapidly vaporize at discharge from the nozzle outlets and thus be delivered as vapor.

If the discharge valve is opened, pressure in the tank headspace (e.g., from the pressurant/propellant noted above) is sufficient to drive liquid suppressant up through the discharge conduit and out of the tank. Pre-use, the surface level of liquid in the tank will typically be well into the upper half of the tank. The exact position will depend on factors including the nature of the suppressant, the nature of the pressurant/propellant (e.g. composition and whether internally or externally located), and the application.

It is necessary to at least occasionally measure the fluid level in the tank (e.g., safety regulations typically require semi-annual inspection including verification of agent amount). To do this without venting the tank, several liquid level measurement systems have been proposed. A number of these systems make use of an additional vertically-extending conduit mounted to an additional port in the tank upper end. Typically, the tanks may be provided with multiple smaller off-center ports (e.g., with internally-threaded fittings) in addition to the center port. These ports may serve for various functions. An exemplary such liquid level sensing system has a fitting mounted to one of those additional port fittings with a conduit (e.g., metal tube) extending vertically down toward the base of the tank. Unlike the discharge conduit, the lower end of this liquid level sensing tube is closed so that the interior of the liquid level sensing tube is sealed relative to the surrounding interior of the tank. A float may surround the liquid level sensing tube. The float may be magnetized. The float may magnetically interact with a member movable within the tube to in turn provide indication of the liquid level.

In one basic example of such a liquid level sensing system, the liquid level sensing fitting, in turn, has a removable cap or plug providing access to the upper end of the tube. A magnetic weight at the end of a measuring tape, string, or other device, may be located in the tube. The magnetic weight will interact with the float to be held at the same level as the float and thus at the level of the surface of liquid in the tank. This allows the level of the surface of liquid in the tank to be measured relative to the liquid level sensing fitting and thus relative to any other reference on the tank. Such measurements are typically taken periodically manually by a person assigned to the task. In one example where the weight and measuring tape are already in the tube, the end of the tape opposite the weight may be connected to the removable cap or plug. The user may open the cap or plug and pull to take up slack in the measuring tape. The user may take a reading with the tape to determine the liquid level of the tank.

Yet more complex systems are automated with the magnetic weight permanently within the tube and its vertical position electronically measured. Yet other systems involve capacitive measurements between inner and outer tubes.

Monitoring of the fire suppression system is typically performed by a fire control panel adjacent the tank(s). The fire control panel may be coupled to one or more sensors or switches on each tank. For example, sensors may include pressure sensors and liquid level sensors and switches may include the control head placement sensor. Exemplary pressure sensors may effectively be switches in that they are set to open or close a circuit at a threshold pressure. The threshold may be set when the fire suppression system is manufactured.

The control head is part of the discharge assembly and actuates a discharge valve on the tank. An exemplary control head placement sensor is disclosed in International Application Pub. No. WO/2016/196104, Publication Date Aug. 12, 2016, of UTC FIRE & SECURITY CORPORATION and inventor Thomas Kjellman, and entitled "EXTERNALLY MOUNTED DEVICE FOR THE SUPERVISION OF A FIRE SUPPRESSION SYSTEM", the disclosure of which is incorporated by reference in its entirety herein as if set forth at length. The control head placement sensor is mounted to the tank and has a switch which is depressed by the presence of a control head of the discharge assembly. The switch may be a normally closed switch or a normally open switch.

Additionally, some stock switches are dual output switches that have three connections/conductors/poles: a common connection ("common"); a normally closed (NC) connection; and a normally open (NO) connection. When such a switch is undepressed, there is no continuity between the normally open pole and the common but there is continuity between the normally closed pole and the common. When the switch is depressed, however, there is conductivity between the normally open pole and common while lacking continuity between the normally closed pole and the common. Some of the normally closed poles and normally open poles may be connected to the fire control panel; whereas, the other may be disconnected from any external device.

The fire control panel monitors and controls the fire suppression system. It collects sensor input from detectors such as smoke sensors and user input devices such as pull boxes. It analyzes sensor inputs to determine if a fault, warning, or alarm condition is present. It communicates this system status locally (e.g., display or status light) and may communicate this status remotely (e.g., via a telephone line or Ethernet or cellular to a remote monitoring station (e.g., computer at a third party monitoring company or fire department)). Depending on the determined status condition (e.g., fault, warning, alarm), the fire control panel controls appropriate connected devices. For example, during alarm condition, the fire control panel may activate notification devices such as strobes and horns and initiate suppressant discharge by activating control heads connected to the suppressant tanks.

The construction and operational parameters of the fire control panels are subject to numerous constraints. For example, there may be code requirements and industry standard requirements (e.g., requirements for a listing by Underwriters Laboratory (UL) or other certification body). In addition to restricting construction and operation of fire control panels, generally, such codes, standards, and approval requirements also affect any updates or retrofits/modifications. For example, if a manufacturer wants to sell an updated version of an approved fire control panel with new constructional details or operational features, the updated version may be subject to requirements for re-approval/re-certification. Similarly, an in-field modification of an existing fire control panel may require such re-approval/recertification. The in-field modification may also require expensive inspection.

SUMMARY

One aspect of the disclosure involves a fire suppression system comprising: a plurality of tank units each comprising: a tank body having a first port and an interior for storing at least one of fire suppressant and driver gas; a discharge assembly mounted to the first port and comprising: a discharge valve; and a first monitoring switch or sensor. A first monitoring unit is coupled to the first monitoring switch or sensor of each said tank unit and configured to communicate with a remote monitoring location. The system further comprises, for each of the tank units: a second monitoring switch or sensor; and a second monitoring unit coupled to said second monitoring switch or sensor and configured to communicate with the remote monitoring location.

In one or more embodiments of any of the other embodiments, the fire suppression unit further comprises a hazard sensor and the first monitoring unit comprises an input from the hazard sensor.

In one or more embodiments of any of the other embodiments, the hazard sensor comprises a smoke detector.

In one or more embodiments of any of the other embodiments, the fire suppression system further comprises a pull box and the first monitoring unit comprises an input from the pull box.

In one or more embodiments of any of the other embodiments, the discharge assembly comprises a control head and the first monitoring unit comprises a control output to the control head.

In one or more embodiments of any of the other embodiments, for each of the tank units, the second monitoring switch or sensor comprises a liquid level sensor not connected to the first monitoring unit.

In one or more embodiments of any of the other embodiments, the second monitoring unit comprises a radio.

In one or more embodiments of any of the other embodiments, the first monitoring switch or sensor is selected from the group consisting of pressure switches or sensors and control head placement switches or sensors.

In one or more embodiments of any of the other embodiments, the second monitoring switch or sensor is not coupled to the first monitoring system.

In one or more embodiments of any of the other embodiments, a hand held device is in wireless communication with each second monitoring unit.

In one or more embodiments of any of the other embodiments, a gateway is in wireless communication with each second monitoring unit, each second monitoring unit configured to communicate with the remote monitoring location via the gateway.

In one or more embodiments of any of the other embodiments, the gateway comprises memory storing information from the second monitoring units.

In one or more embodiments of any of the other embodiments, the second monitoring units are configured to communicate with each other.

In one or more embodiments of any of the other embodiments, the second monitoring units are configured to communicate directly with each other.

In one or more embodiments of any of the other embodiments, the second monitoring units are configured to communicate (421) with each other via Bluetooth mesh networking.

In one or more embodiments of any of the other embodiments, the second monitoring units are configured to each store status data from all the second monitoring units so that any of the second monitoring units may communicate said data to a local handheld device.

In one or more embodiments of any of the other embodiments, the second monitoring units are configured to each store said status data from all the second monitoring units at predetermined times; and the second monitoring units are configured so a user of the local handheld device may manually activate said any of the second monitoring units to communicate said data to the local handheld device.

In one or more embodiments of any of the other embodiments, the second monitoring units are configured to wake up from a sleep mode in response to input from the second monitoring switch or sensor or the first monitoring switch or sensor.

In one or more embodiments of any of the other embodiments, a method for using the system comprises: with the first monitoring unit, receiving input from one or more hazard sensors or pull boxes; and with each second monitoring unit, communicating status via a radio.

In one or more embodiments of any of the other embodiments, the method further comprises, with the first monitoring unit, controlling suppressant delivery.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
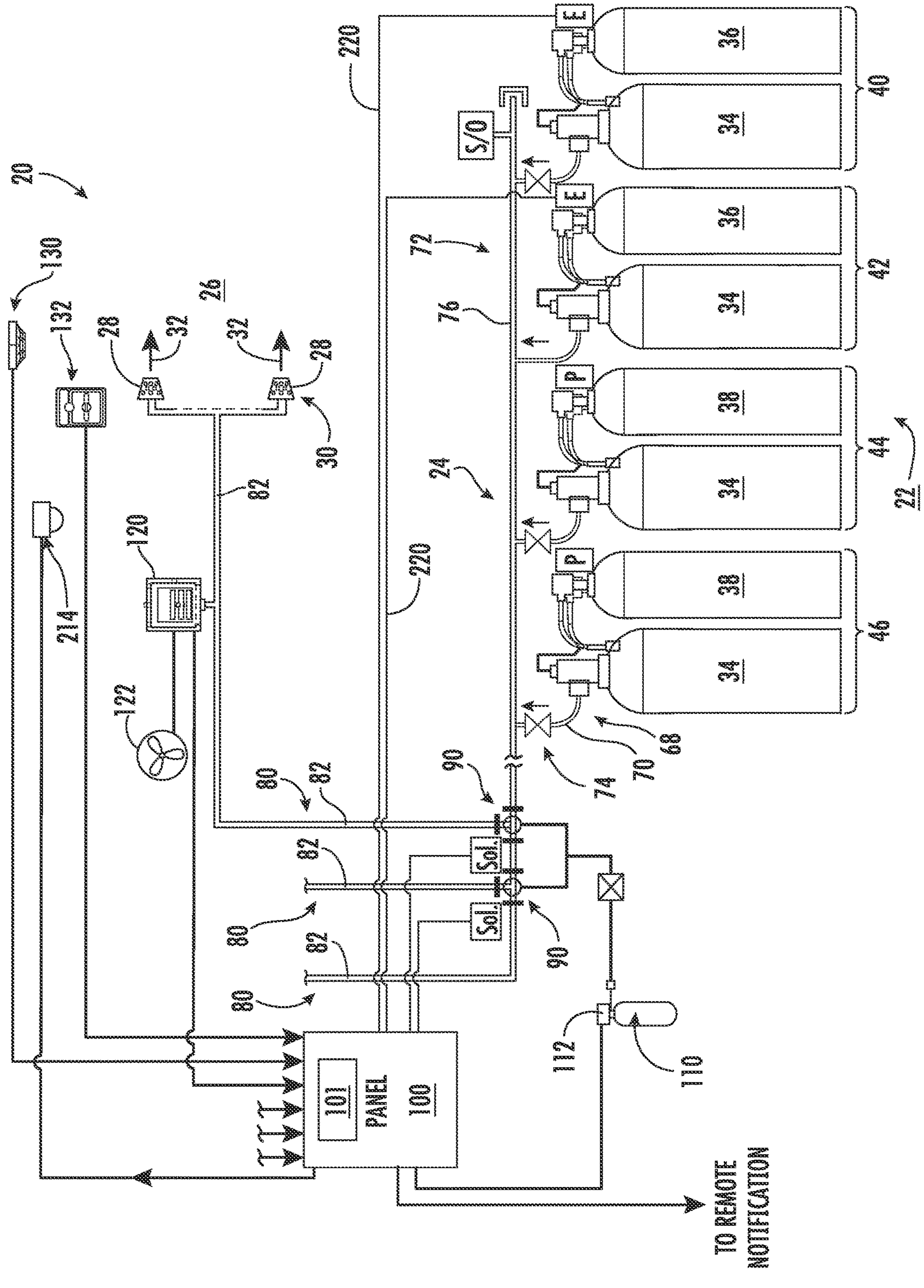
FIG. 1 is a schematic view of a fire suppression system.

FIG. 1 shows a fire suppression system 20. The system includes a suppressant source 22 and one or more flowpaths 24 to one or more protected locations (also known as "hazards") 26. The flowpath(s) 24 pass from the source 22 to outlets 28 at the location(s) 26. The exemplary outlets 28 are outlets of discharge nozzles 30 for discharging discharge streams or flows 32.

The exemplary source 22 includes multiple tanks 34 of suppressant (agent). The exemplary configuration is a remote driver configuration where the pressurant for each agent tank is remote of that tank. An exemplary agent is a liquid agent and an exemplary pressurant is nitrogen and/or argon. FIG. 1 shows each agent tank respectively associated with a driver or pressurant tank 36, 38 in a unit 40, 42, 44, 46. However in alternative situations either the agent itself is also a pressurant (e.g., inert gas systems) or the pressurant is stored in the headspace of the agent tank. The exemplary configuration includes three kinds of units. Unit 40 serves as the primary unit. Its driver tank 36 is equipped with an electric control head 200 (FIG. 2) controlled by the fire control panel 100 via a line 220. In the illustrated example, an optional reserve unit, 42 (FIG. 1) also has a driver tank with an electric control head 200 controlled by the fire control panel (via its own line 220).

To handle situations where a single suppressant tank is insufficient to protect hazard locations 26, the suppressant source 22 contains additional, secondary units 44, 46. These secondary units are each equipped with a pneumatic control head 202 (FIG. 2) connected in-series to each other and to the primary suppression unit 40 or the reserve suppression unit 42. The illustrated example has a series connection along a flowpath 210 from the primary unit 40 to the first secondary unit 44 and then to the second secondary unit 46 via conduits (e.g., hoses) 212.

The system 20 may further include a reserve unit 42 which may be controlled independently of the primary and secondary units. This may be used to address re-ignition situations or situations where the primary and secondary units are insufficient to even temporarily extinguish a hazardous condition. The reserve unit may itself be a primary unit having one or more associated secondary units.

Figure 2:
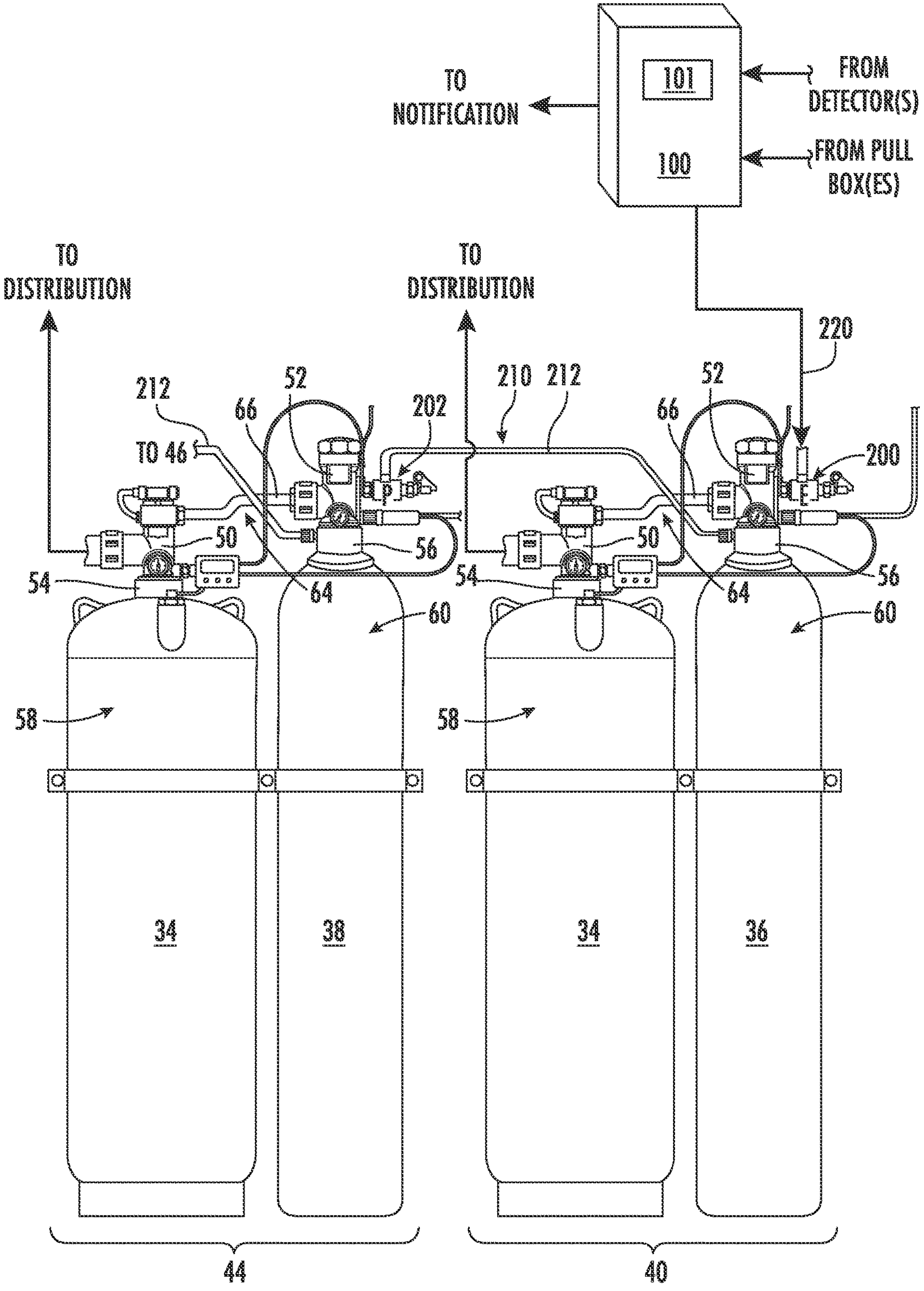
FIG. 2 is a view of two suppressant tanks and associated driver tanks of the system of FIG. 1.

As shown in FIG. 2, the respective suppressant tanks 34 and driver tanks 36, 38 each have a valve 50, 52 mounted to a fitting 54, 56 of a tank body 58, 60. A pressurant flowpath 64 extends through a driver conduit 66 (e.g., hose) between the associated valves 50, 52.

The flowpaths 24 (FIG. 1) comprise respective legs 68 though conduits 70 (FIG. 1, e.g., hoses) from the agent tank valve 50 to a supply manifold 72. Valves 74 (e.g., check valves) may be located along the legs 68 upstream of a manifold conduit 76 (e.g., metal pipe).

The flowpaths 24 comprise respective legs 80 though conduits 82 (FIG. 1, e.g., metal pipe) from the manifold conduit 76 to the locations 26 One or more valves 90 may selectively permit or block flow along the flowpath legs 80. The exemplary valves 90 are solenoid valves controlled by a fire control panel 100. Exemplary solenoid valves 90 are piloted valves piloted by a gas (e.g., nitrogen) from a pilot tank 110 having a discharge valve 112 controlled by the fire control panel.

FIG. 1 also shows a pressure switch 120. There may be such pressure switches exposed to the respective flowpaths 80 and each may have one or more functions. The pressure switch is activated upon pressurization of the associated flowpath 80. A first function is to turn on or turn off electrical appliances that would respectively assist or impede the effectiveness of the suppression system. Examples of the electrical appliances 122 include, but are not limited to speakers and sirens to warn occupants located in spaces 26 of imminent suppressant release, air handling units supplying and retrieving air from the spaces 26 (e.g., the switch might turn off HVAC components to limit air inflow to the affected space and keep suppressant in the space), door and window actuators (e.g., the switch might close such doors and windows to limit air introduction and suppressant loss) and related appliances (e.g., louvers). The pressure switch 120 may also be connected to the fire control panel 100 and communicate its status information such as ready, activated or malfunction.

Figure 7:
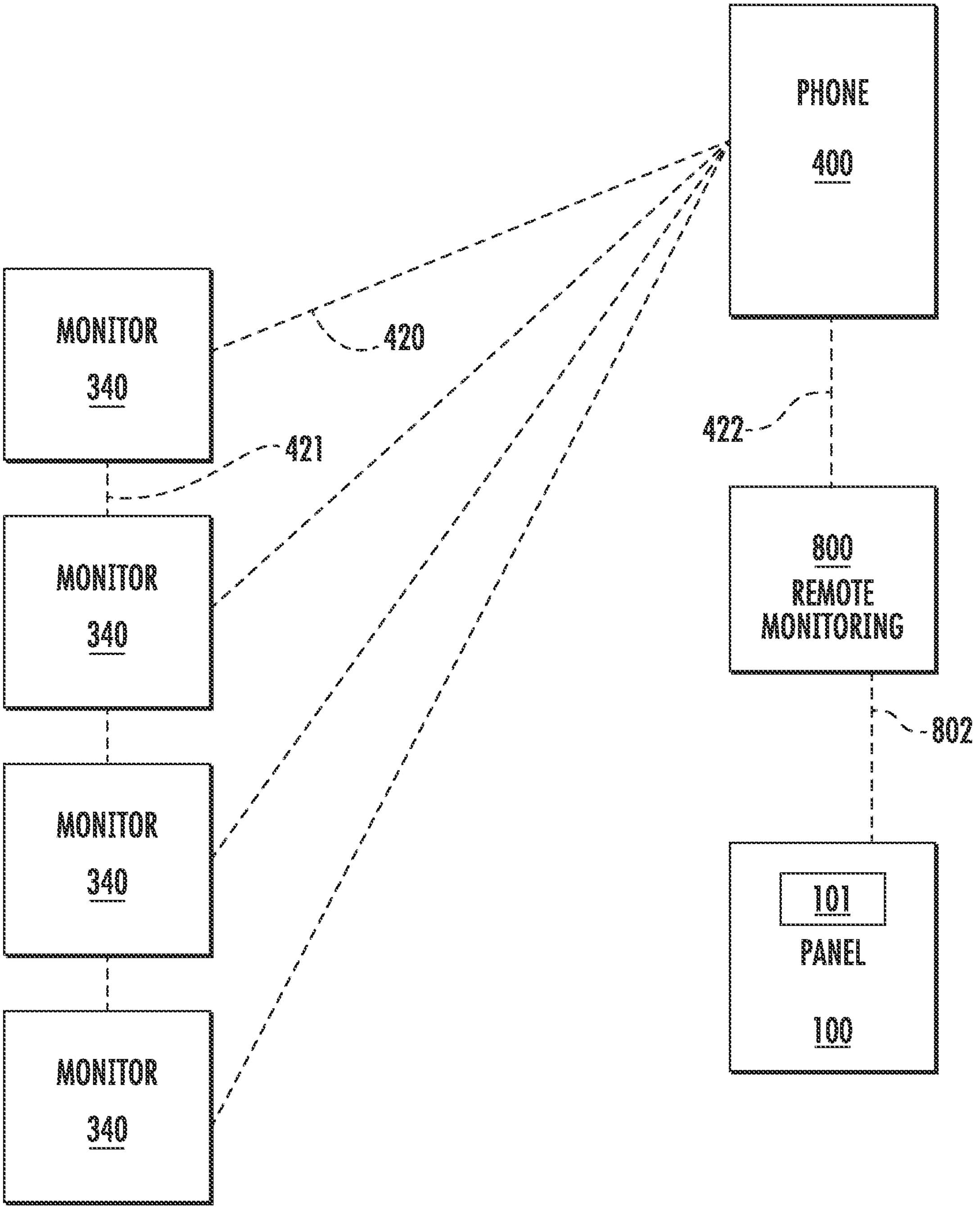
FIG. 7 is a view of communications in the system of FIG. 1.

FIG. 1 also shows, at each location 26, one or more sensors/detectors 130 (e.g., smoke detectors, heat detectors, and the like) and one or more pull boxes. These may be hardwired to the fire control panel. Referring to FIGS. 1 and 2 together, exemplary system activation involves the fire control panel receiving input (e.g., simple switched input or a digital or analog input) from a sensor/detector 130 or pull box 132. The fire control panel then activates the primary unit 40. To do so, the fire control panel sends a signal (e.g., applies power via the associated line 220) to the primary unit 40 electric control head 200 which, in turn actuates (opens) the associated valve 52. Pressurant stored in the primary unit driver passes through the associated conduit 66 and pushes the primary unit's suppressant through the conduit 70 into the distribution piping 76. Simultaneously, the pressure from the primary unit's driver is also transmitted through the first conduit 212 to the first secondary unit's pneumatic control head 202. This pressure opens the first secondary unit's valve 52 causing further release of the suppressant into the distribution piping and further activation of additional secondary unit(s) via the remaining sequential conduits 212. When releasing pressurant, the fire control panel may issue appropriate control signals to one or more local notification devices 214 such as speakers (for audible warnings such as alarms or prerecorded or synthesized voice warnings), other audio sources such as horns, and/or visual sources such as strobes or other lights to warn personnel in the area of a hazardous condition. The fire control panel may also issue an alarm signal to a remote notification station such as monitoring center or fire station (800 via communications link 802 in FIG. 7 discussed below).

However in alternative (integrated) situations either the agent itself is also a pressurant (e.g., inert gas systems) or the pressurant is stored in the headspace of the agent tank and the driver tanks are not required. In that case, the electronic control head(s) 200 and pneumatic control heads 202 are located on the corresponding suppressant tanks.

Figure 3:
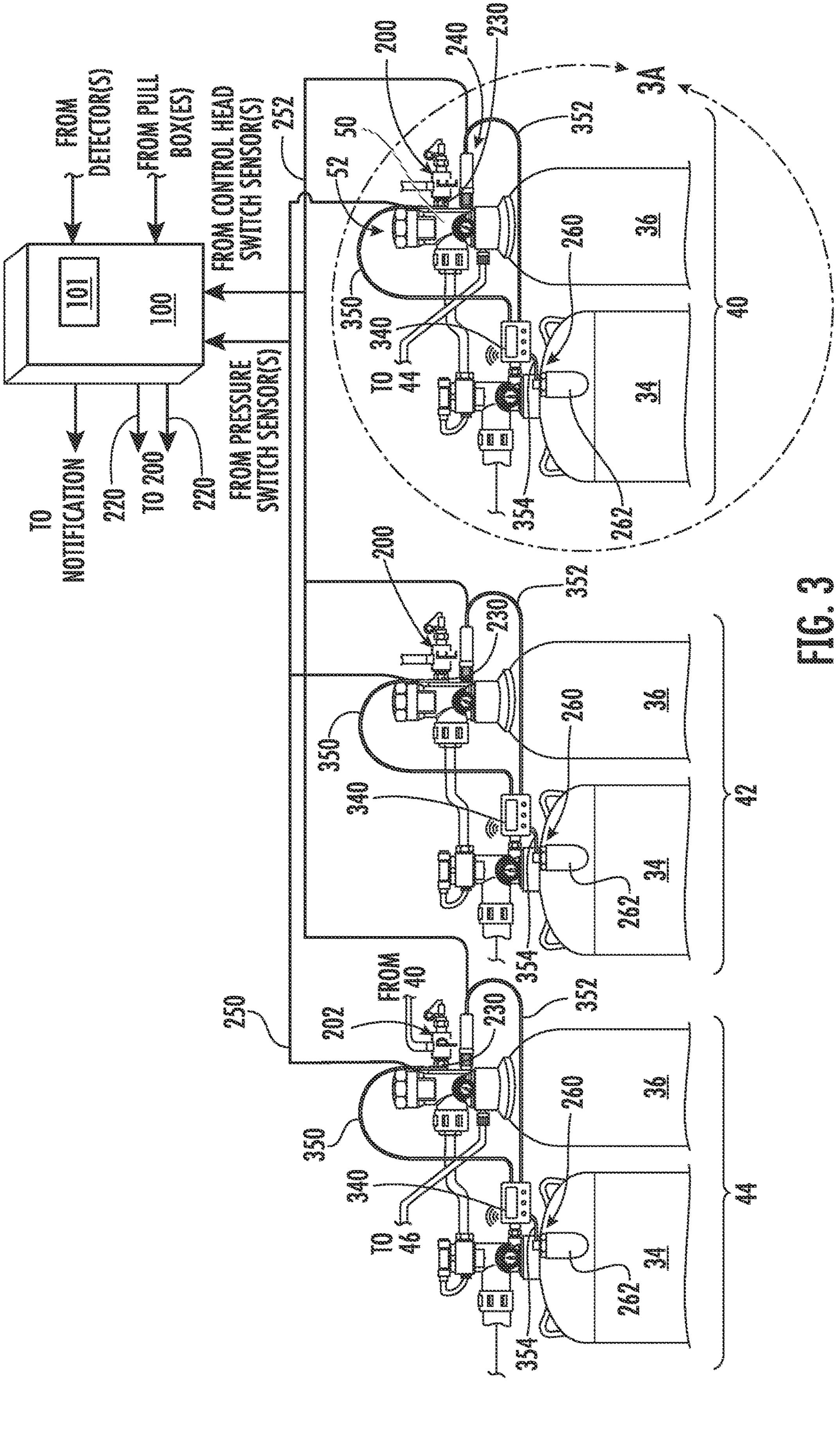
FIG. 3 is a partial view of three suppressant tanks of the suppression system of FIG. 1 with the associated sensors and controls.

FIG. 3 further shows one or more of the suppressant tanks and driver tanks as having a control head placement switch sensor 230 (e.g. as in WO/2016/196104), which is mounted to the tank and incorporates a switch which is depressed by the presence of a control head on the valve 52 (discharge valve assembly) (FIG. 2). In remote driver examples, the control head placement switch sensor 230 may be only on the drivers; in integrated examples it is on the suppressant tanks. In one example, the control head placement switch sensors may be mounted on the primary unit tank and the reserve unit tank, but not the secondary unit tanks. The exemplary switch sensors are further connected on a common circuit loop 250 either in series or in parallel and wired to the fire control panel for supervisory monitoring of fault conditions. The supervisory circuit within the fire control panel interrogates the status of the placement switch sensors by measuring circuit resistance, for example. Change in state of the placement switch sensors (for example connected to the control head or disconnected) results in, for example, change in the circuit resistance detected by the control panel. The panel issues the appropriate fault condition warning through its internal display upon detecting that any one of the placement switch sensors indicates loss of control head connectivity to the body of valve body 50, 52.

The exemplary suppression system 20 has pressure switch sensors 240 (FIG. 3A, e.g., diaphragm-type mechanical switch), mounted to primary, reserve and secondary tanks (either or both suppressant and driver tanks). These pressure switch sensors are further connected together on a common circuit loop 252 and wired to the control panel for supervisory monitoring. The supervisory circuit within the control panel interrogates the status of the pressure switch sensors by measuring circuit resistance for example. Change in state of the pressure switch sensors (for example loss of pressure within the tank) results in, for example, change in the circuit resistance detected by the control panel. The panel issues the appropriate fault condition warning through its internal display 101 upon detecting that any one of the pressure switch sensors indicates change of pressure within the tanks. The panel 100 issues warnings indicative of the disconnected control head or pressure loss within any given tank. Within the typical system, further identification of the specific tank affected with disconnected control head or pressure loss in not possible. Therefore, each individual tank requires independent inspection to localize the issue and take appropriate corrective action such as re-installation of the control head or re-pressurizing of the tank. This is problematic and time consuming for large installations containing tens and hundreds of tanks.

Figure 4:
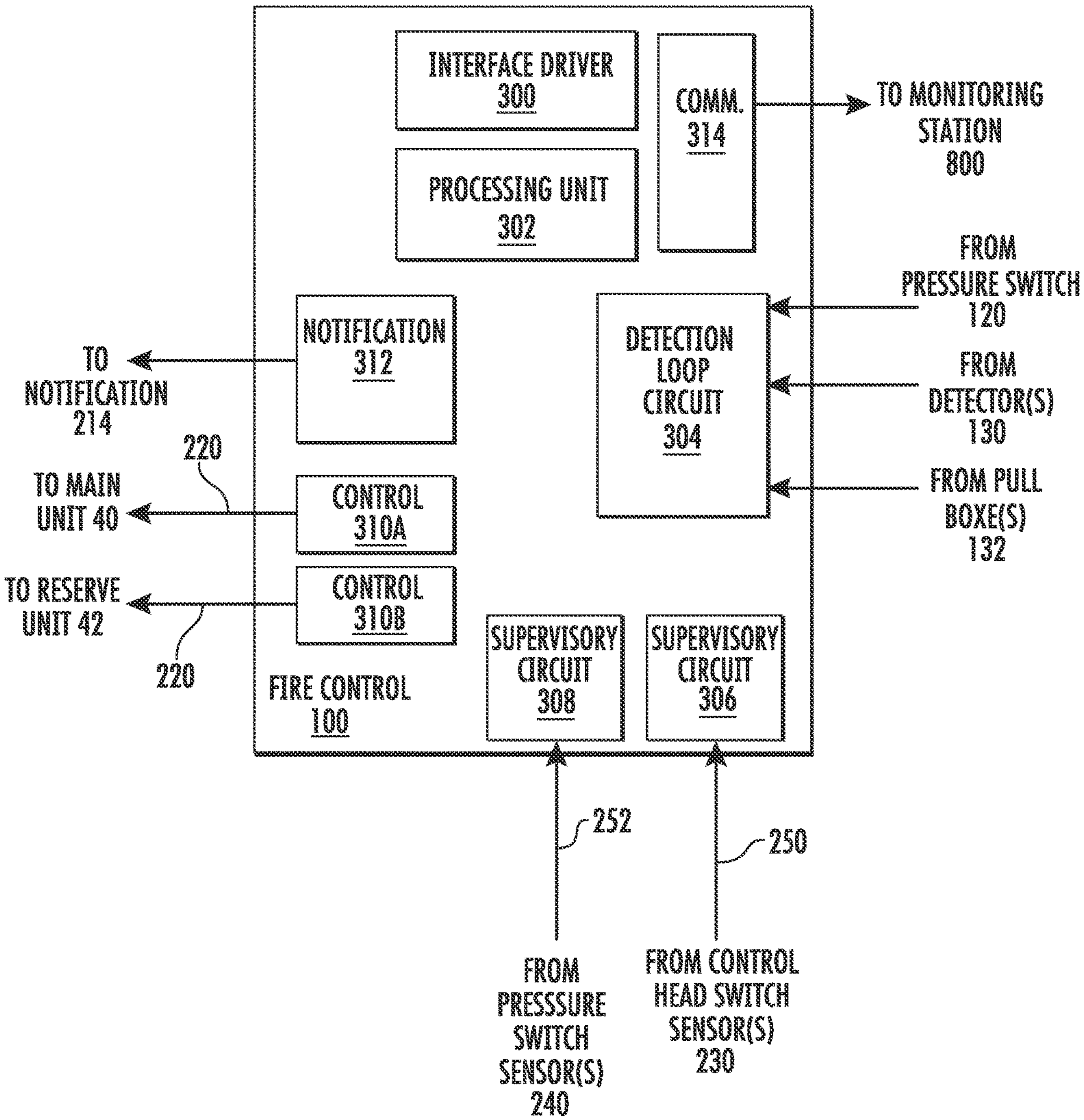
FIG. 4 is a schematic of a fire control panel.

The fire control panel 100 is schematically represented in FIG. 4. A user interface driver 300 supports display (101 above), keyboard, and related functions. The main processing unit 302 (e.g., having a microprocessor and memory/storage (e.g., solid state)) receives information from all input circuits, performs the system status determination and issues instructions to control circuits and the display. The detection loop circuit 304 receives status information from all the system input devices such as smoke sensors, heat sensors, and user pull boxes and relays this information to the processing unit. The control head monitor supervisory circuit 306, receives status information from the control head switch sensors. Similarly, the pressure switch sensor supervisory circuit 308, receives status information from the pressure switch sensors. Both supervisory circuits relay this information to the main processing unit. The control circuits 310A and 310B (FIG. 4) appropriately energize control heads 200 and thus the associated valves 52 and 50 as to initiate the system response based on signals received from the main processing unit. Similarly, the notification control circuit 312, activates notification devices such as voice warnings, strobes and horns based on signals received from the main processing unit. The control panel may also contain communication module 314 allowing the system status to be monitored remotely such as at a monitoring station. The communication module 314 interface may be an Ethernet connection for connection via router/modem to the Internet or may comprise a connection to a telephone landline, or may comprise a wireless telephone (e.g., cellular) connection. The exemplary fire control panel may contain additional circuits and modules to receive additional input and provide additional output depending on type of installation and system complexity.

As so far described, the system is merely one example of a baseline system to which further modifications may be made. An exemplary modified system discussed below adds a parallel monitoring functionality to that already provided by the baseline. The exemplary modified system makes use of dual output sensors or switches (collectively "switches" unless indicated to the contrary) if present or provides dual output switches for parallel monitoring of a given switch. The modified system may add monitoring functions (and associated switches) not present in the baseline. In one example, the added functionality is a liquid level monitoring functionality using a liquid level sensor 260 (FIG. 3, e.g., a magnetic float sensor) mounted to a fitting 262 on the suppressant tank. In another example, the added functionality is a temperature sensing functionality using a thermistor 261 (FIG. 3A) collocated with the liquid level sensor.

FIG. 3 shows the modified system as having an additional monitor module 340 (also see FIG. 6 schematic discussed below) associated with each unit 40, 42, 44, 46. Each monitor module 340 is connected to the associated control head placement switch sensor(s) 230, pressure switch sensor 240, and level sensor 260 through wired connections 350, 352, 354, respectively. The connection 250 from the control head placement sensors and the connection 252 from pressure switch sensors to the control panel 100 are independent of the respective associated connections 350 and 352 to the monitor module 340.

As is discussed further below, each monitor module 340 may include visual output devices such as a display 362 (FIG. 6, e.g., LCD or LED) and one or more status indicator lights 364, 366 (e.g., colored LED). For example, the display displays information such as type, quantity and temperature of an agent present within the tank (e.g., "FM-200; 210 lbs.; 78 F"), while the indicator lights indicate status of the control head placement sensor and the pressure switch sensor (e.g., green light indicating connected control head and appropriately pressurized tank; red light indicating disconnected control head and inadequate pressure within the tank). The monitor module may include one or more user input devices (e.g., switches 368, 370 and/or the display 362 being a touchscreen). These input devices are used, for example, to switch display on/off, change units (e.g., from lbs. to kg), and to activate one or more radios 372, 374 (e.g., transmitter/receivers). The monitor module may include A/D converter 376 (e.g., chipset transforming analog voltage and current signals to digital signals), microcontroller 377 (e.g., chipset retrieving and transmitting digital signals and executing programs) and memory 378 (e.g., non-volatile memory for storing data and programs). Thus, analog signals transmitted via sensor connections 350, 352, and 354 are transposed into digital signals by the A/D converter and transmitted to the microcontroller for processing. The microcontroller loads, from the memory, the expected values of the sensor outputs along with the appropriate analysis program, computes response, and transmits the results to the display, indicator lights or radios. The monitor module may include battery 379 as internal power supply.

The microcontroller 377 stores in the memory 378 status information for the sensors attached to the associated suppression unit 40, 42, 44, or 46. Such information may include any combination of parameters such as: suppression unit identifying information (e.g., identification or serial number); the control head placement switch sensor 230 status (e.g., attached or disconnected); the pressure switch sensor 240 status (e.g., OK or low pressure); the agent temperature (e.g. from a temperature sensor (e.g., 261), such as a thermistor on or in the suppressant tank); the agent level within the tank (e.g., from the liquid level sensor 260); the computed agent mass (e.g., from the measured temperature and the agent level data); the monitor module battery 379 charge level; the monitor module connectivity status (e.g., connected to other monitor module(s), connected to hand held device 400 (FIG. 7), connected to gateway(s) 600 (FIG. 11) or disconnected); and the like. In the case when the particular monitor module is connected (link 421-FIG. 7) to a second monitor module (e.g., it receives status information transmitted by the monitor module of a neighboring suppression unit), the microcontroller also stores the status information for this second monitor module within the memory in the analogous format. For multiple monitor modules connected together, the memory of each monitor module is sufficiently large to contain status information of all the suppression tank units located within a given site or particular area thereof.

In the particular example, while the sensors 230, 240 are connected to fire control panel 100 through their normally closed (NC) terminals, the normally open (NO) terminals are connected to the monitor module 340. The reversed configuration is also possible with NC sensor switch terminals connected to the control panel and the NO terminals connected to the monitor module. The monitor module 340 offers localization of the fault condition warning at each individual unit. This offers significantly simplified system inspection for fault conditions.

Figure 3A:
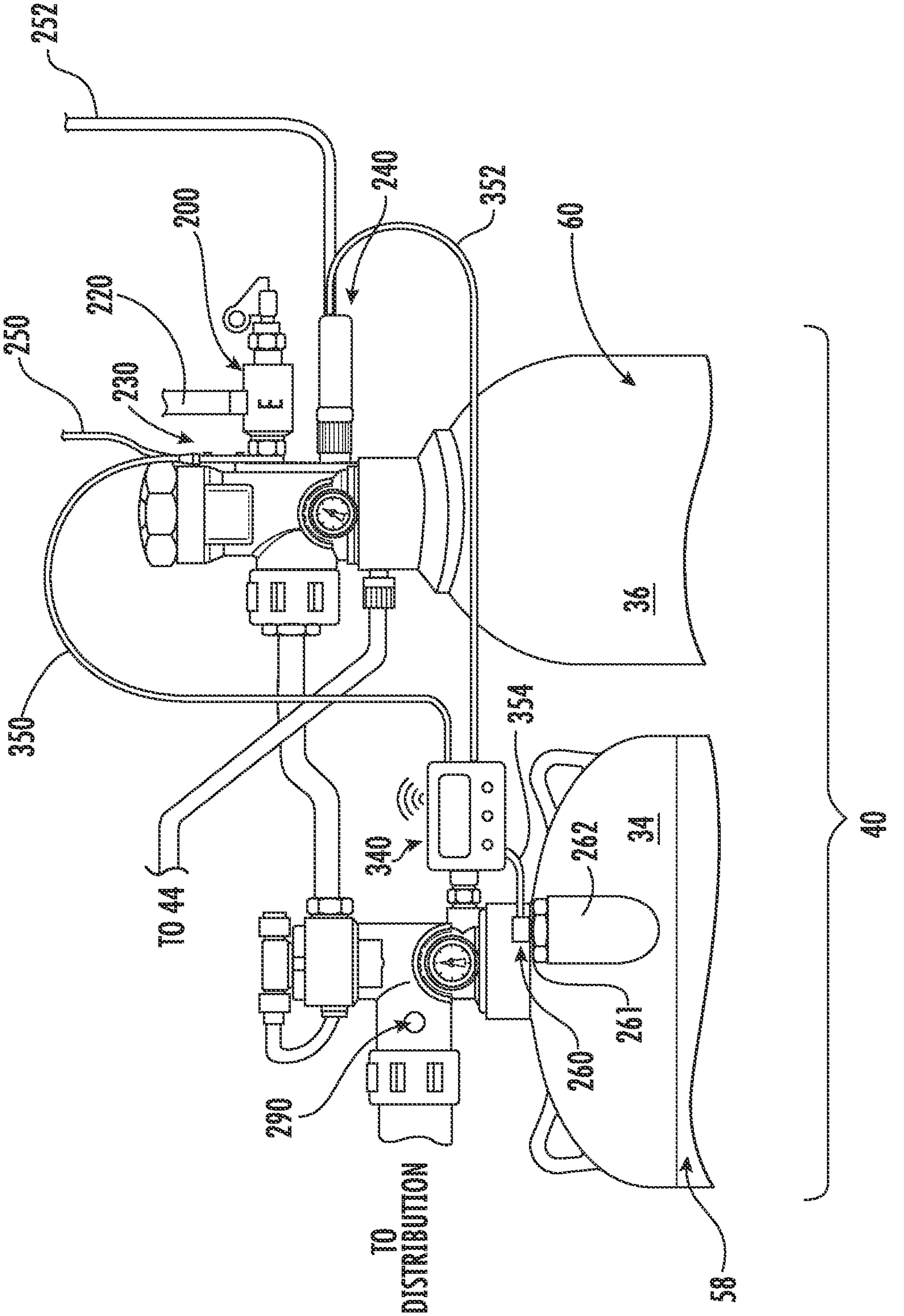
FIG. 3A is a detail view of a unit of FIG. 3.

In addition, the exemplary monitor module 340 is connected to electronic level sensor 260 via connection 354 (FIGS. 3 and 3A). In this case, the sensor 260 supplies data indicative of the agent quantity present within the associated suppressant tank. The monitor module 340 display may locally display the status information for any given tank including connectivity of the control head, pressure condition within the tank, and the agent quantity. The monitor module radios may provide communication: with remote sites (e.g., offsite monitoring); with other monitor modules; and/or with a user's local hand held device 400 (FIG. 7) such as a mobile phone, tablet, laptop, or other portable device. Exemplary short range wireless communication 420 and 421 may be Bluetooth via one of the radios (e.g., 372-FIG. 6). Alternative wireless communication protocols may be used if suitable, including WiFi, ZigBee, and the like). An example of a peer-to-peer network using Bluetooth protocol is a Bluetooth mesh network (Bluetooth mesh networking). This provides simultaneous communication of multiple monitor modules 340 among each other and with hand held device 400 and gateway 600. The hand held device 400 may further communicate system status to a remote notification station 800 (FIG. 7), such as monitoring center or fire station. Exemplary communication 422 is data over the wireless carrier's network and internet (e.g., over the radio 374). One or more servers (not shown, e.g., cloud servers) may intervene in the communication 422 and may store relevant data about and from the system (e.g., and about and from other systems at other facilities). Alternative communications 422 may be Ethernet or WiFi (e.g., with another radio) via router/modem (e.g., cable modem) to the internet or may comprise a connection to a telephone landline. The monitor module may thus provide local or remote monitoring and diagnosis of the suppression system 20 without connection to or other use of the fire control panel 100. Consequently, the monitor module is not subject to requirements for re-approval/re-certification typically mandated by codes and industry standards.

Communication between the monitor modules 340 and the hand held device may be direct for all monitor modules 340 or may be direct for some but indirect for others. As an example, the monitor modules 340 may be spread far enough apart that the hand held device can't communicate with all of them from a given location (e.g., the total span exceeds Bluetooth range). However, the gaps between monitor modules 340 may be small enough to allow chained communication 421 (e.g., with gaps less than Bluetooth range). Thus, each of the monitor modules 340 may be configured to share its data via chained inter-module communication 421 with all the other modules and store such data from all the modules. Thus, when a technician arrives, the technician's hand held device 400 may communicate 421 with just one module 340 to acquire data from all.

Such chained communication or other inter-module communication 421 has uses even where all modules 340 are within range of each other or the hand held device. For example, to save power, the modules 340 may be configured to normally be in a low power sleep mode and wake up to store and share data at specific times (e.g., daily at 12 am and 12 pm). The technician arriving between such times may then manually awaken one of the modules 340 (e.g., by pressing a button/switch) to then establish communication 420 between that module and the hand held device to then download to the hand held device the data from all modules 340 stored on the single awake module.

Figure 8:
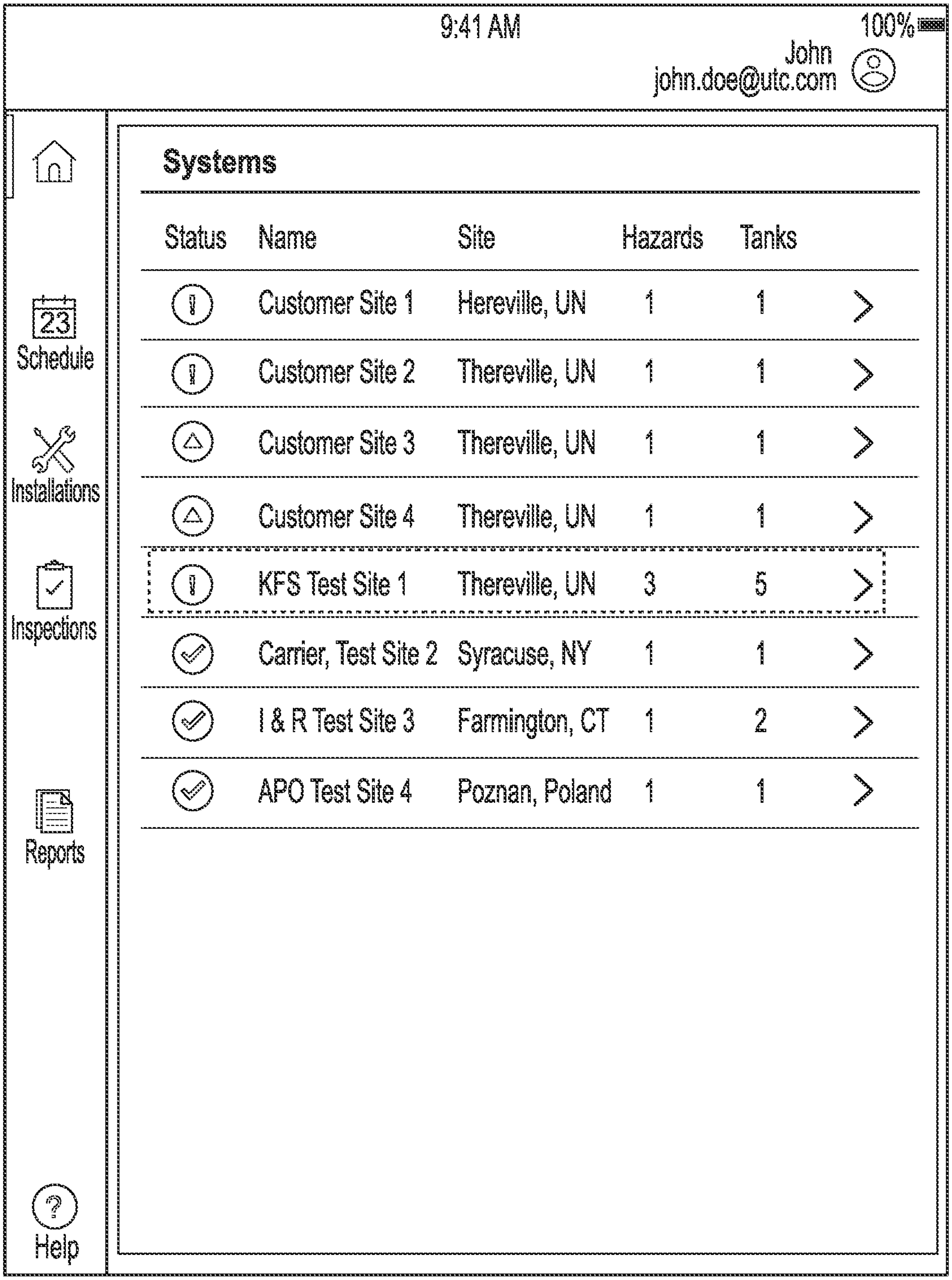
FIGS. 8, 9, and 10 are screenshots of a user interface on a hand held device in the system of FIG. 1.
Figure 9:
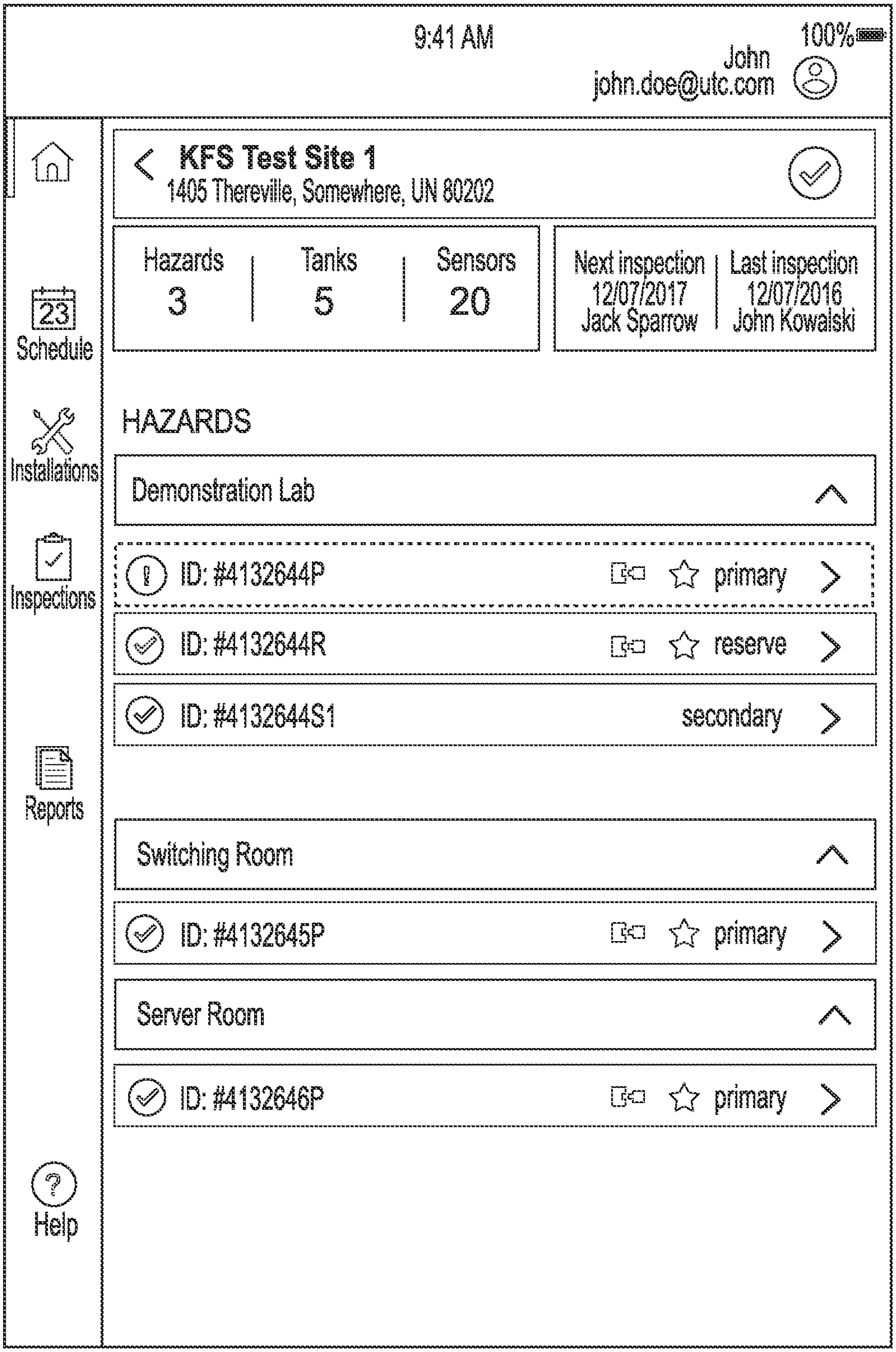
Figure 10:
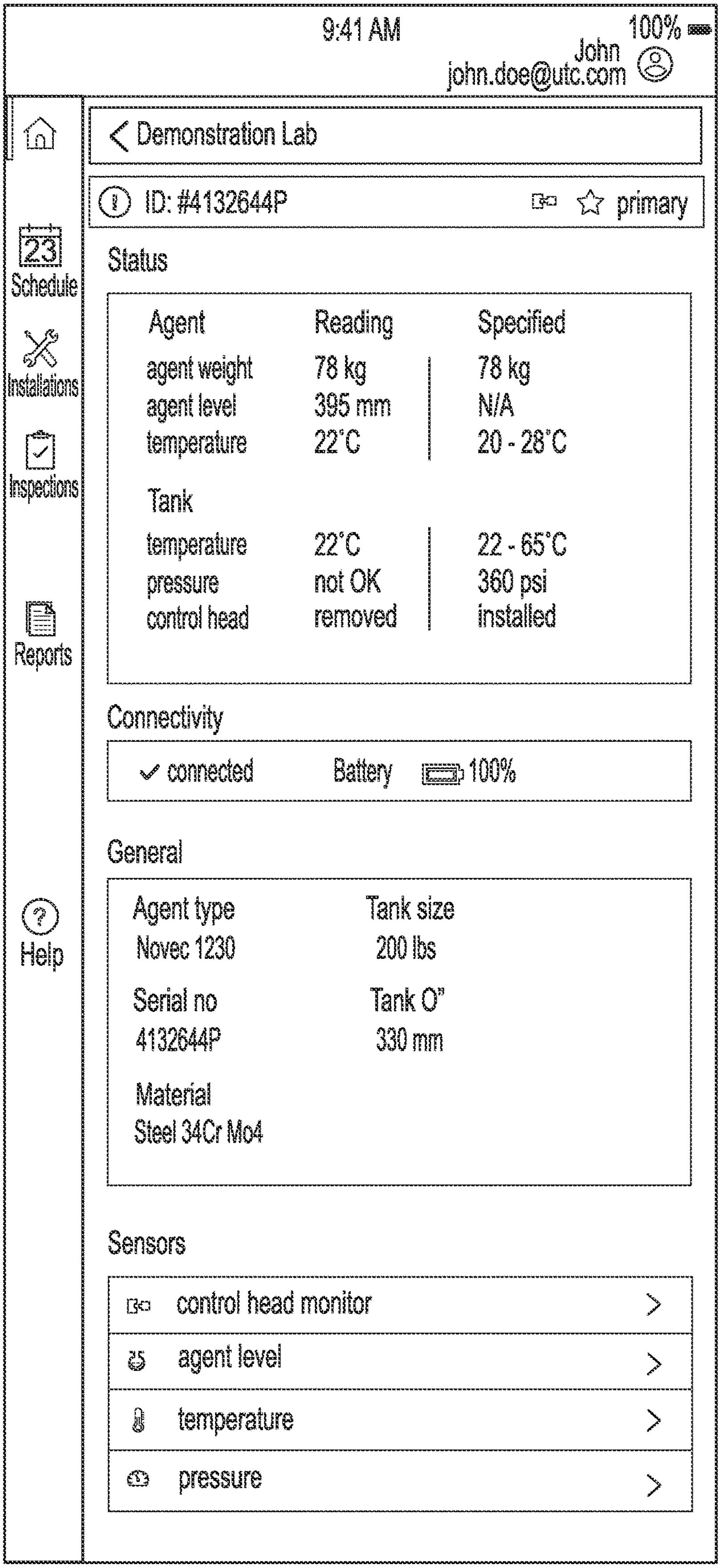

FIGS. 8 through 10 show example screens on the hand held device 400 associated with the task of inspecting an example suppression system. In an exemplary situation, upon entering the equipment room, if not earlier, the inspecting technician signs into the suppression system monitoring application via a login screen (not shown). The app on the device 400 may then (or may already automatically have) establish communication 420 with the monitors 340. Upon logging in, the exemplary app displays the different suppression systems pre-authorized to the technician together with their status information (FIG. 8). The pre-authorized systems might comprise all systems serviced by the technician's company or may be the limited fraction of those assigned to the technician's service area or the yet more limited fraction represented by that day's route of the technician, among other possibilities. The app may use text, graphics, or some combination thereof to display in a user-readable format information about system status. In some exemplary embodiments, auditory alerts or visual indicators, for example, a sound or light on handheld device 400, may also be used to provide an "alert". In one example of the FIG. 8 display screen; a checkmark within a green circle represents "system normal" status; a triangle within a yellow circle represents "system warning" status (e.g., sensor connectivity is intermittent, sensor battery is close to discharging, or the like); an exclamation mark within a red circle represents "supervisory fault" status (e.g., agent level too low, tank pressure too low, control head(s) disconnected, sensor battery discharged, lost sensor connectivity, or the like). Selecting (e.g., tapping the associated line on the display) any one of the overviewed systems results in displaying more detailed information (FIG. 9) including status information of all the associated suppression tank units. Further selection of the particular tank unit results in displaying detailed status information pertaining to that tank unit (FIG. 10) including sensor data, sensor connectivity, sensor battery level(s) and pinpoints specific fault(s) if present. Other system parameters may also be displayed such as specified (or expected) condition(s), tank unit specification (e.g. size, material, diameter, type of agent).

Figure 5:
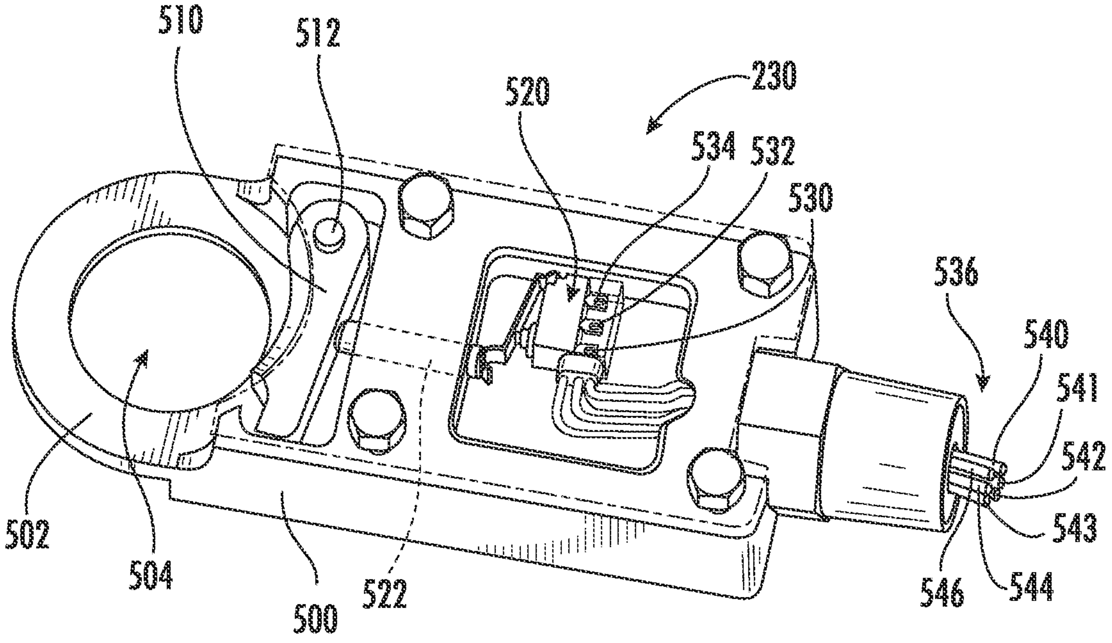
FIG. 5 is a schematic of a control head monitor switch sensor.

As discussed above, one characteristic of some embodiments of the monitoring module is to share a sensor or switch with the fire control panel 100 by using different poles or other outputs of that sensor or switch. FIG. 5 illustrates this schematically in the context of an exemplary control head placement switch sensor 230 based on that of WO/2016/196104. The switch sensor 230 has a body 500 having a collar portion 502 encircling an opening 504 dimensioned to receive a base portion of the control head. In WO/2016/196104 the control head mounts atop a discharge valve, the collar is mounted to a top fitting of the discharge valve. Alternatively, in FIG. 3A, control head extends from the side of the valve 52 and the head placement switch sensor 230 may be positioned with the axis of its opening extending horizontally (transverse to the tank fitting and valve axis). A trigger 510 is positioned to have a pivoting range of motion about a pivot 512 between an extended condition and a retracted or depressed condition (extended shown). The exemplary switch sensor 230 is configured so that the trigger is depressed by the proper installation of the control head (e.g., by the placement of a swivel nut). The switch sensor 230 further comprises a switch 520 coupled to the trigger via a plunger 522. The exemplary switch 520 is a stock dual output switch offering three poles: a common pole 530; a normally closed (NC) pole 532; and a normally open (NO) pole 534 connected through a wire harness 536. The exemplary wire harness has six conductors with three conductors 540, 541, 542 connected to the common pole, two conductors 543, 544 connected to the NO pole, and one conductor 546 connected to the NC pole. Alternatively, two conductors could be connected to the NC pole and one conductor to the NO pole. The multiple conductors facilitate universal installation of the sensors within the common circuit loop 250 connected to the control head monitor supervisory circuit 306 within the fire control panel. For example, the sensors (e.g., all the control head sensors of the particular unit) may be wired in-parallel through the common and NO poles. In that case, conductors 540, 541 comprise the common pole connections, while the conductors 543, 544 comprise the NO pole connections within the common circuit loop 250. When any switch closes due to removal of the control head, the common circuit loop is shorted and the supervisory circuit 306 detects this short and communicates to the main processing unit 302 within the fire control panel 100 a supervisory fault condition. The remaining two conductors 542, 546 within the wire harness 536 may be wired to the monitor module 340. In this case, the monitor module is configured to detect NC condition. When the control head is removed, the conductors 542, 546 open and the monitor module issues appropriate supervisory fault warning locally for the particular tank pair (e.g., warning light or alphanumeric indication of particular fault). In parallel, this supervisory fault status is also communicated to the hand held device and displayed in the monitoring application (FIGS. 8 through 10).

With only one of the normally open (NO) conductor and normally closed (NC) conductor of a given such switch coupled to the fire control panel, the other is free for use in a secondary monitoring system such as the monitor module 340. Coupling of the secondary monitoring system to the otherwise unused contact does not affect code or other compliance. Thus, the addition of or subsequent modifications to the secondary monitoring system may be made without all the complications required to make modifications to the fire control panel.

Figure 11:
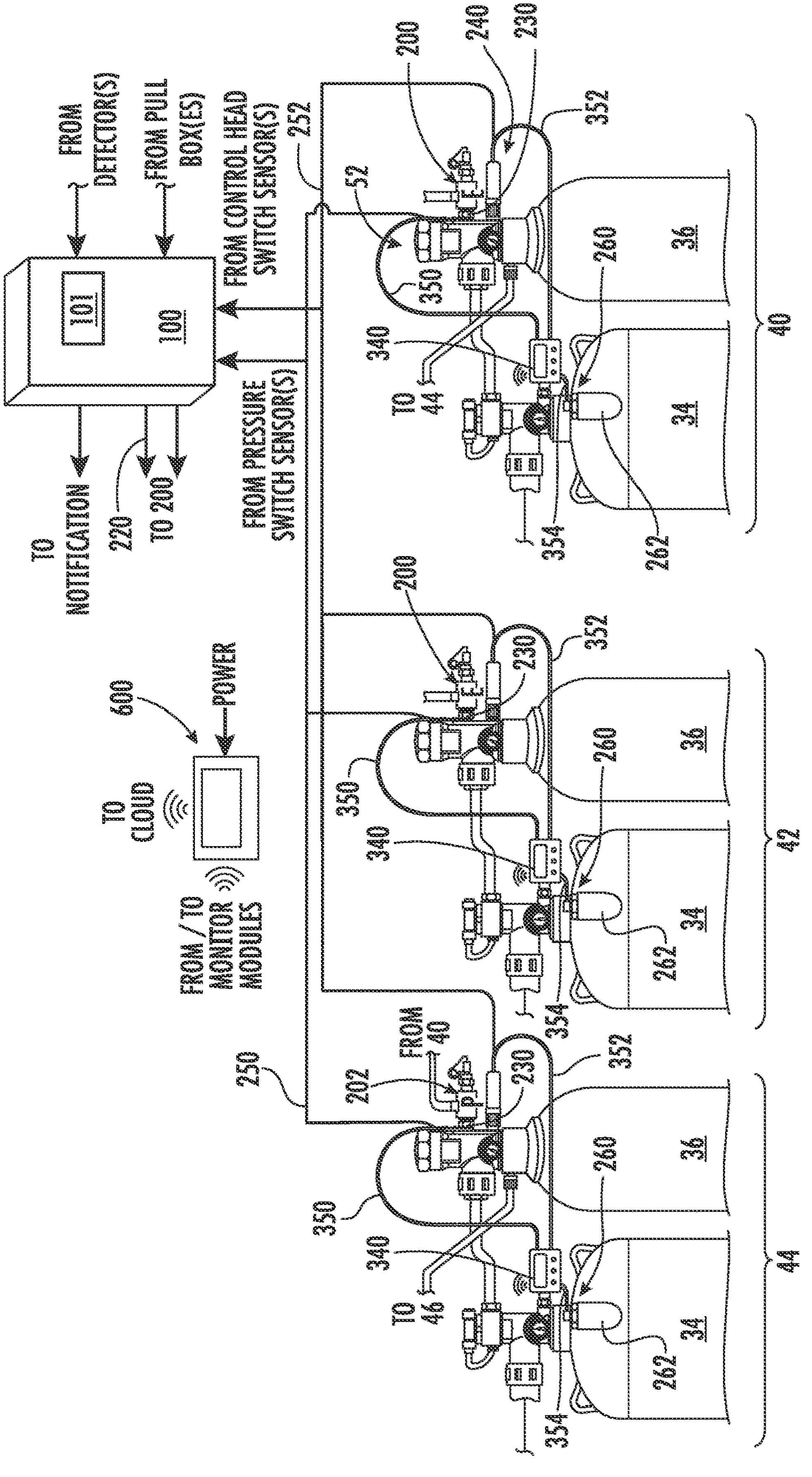
FIG. 11 is a view of a second fire suppression system.
Figure 12:
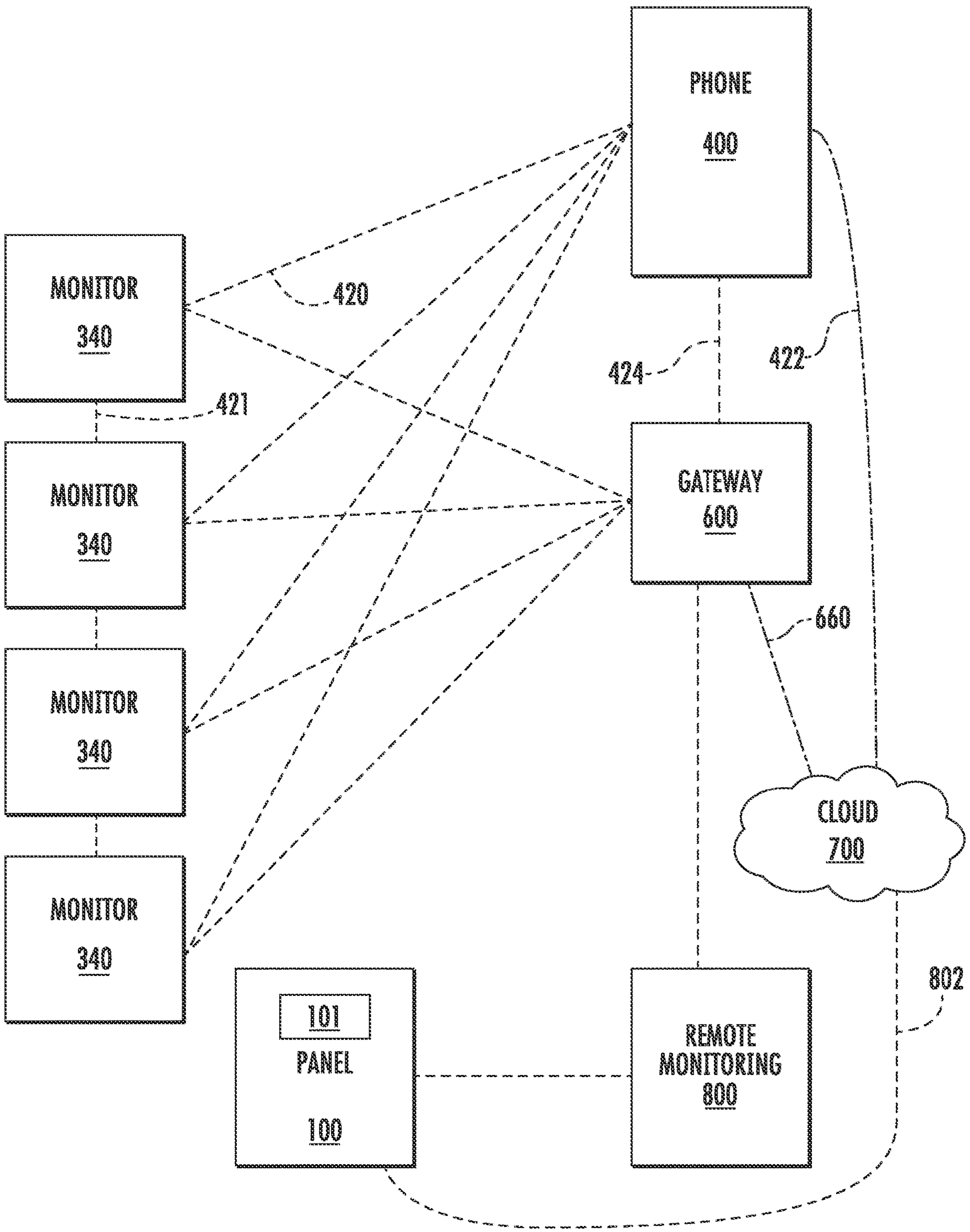
FIG. 12 is a view of communications in the system of FIG. 11.
Figure 13:
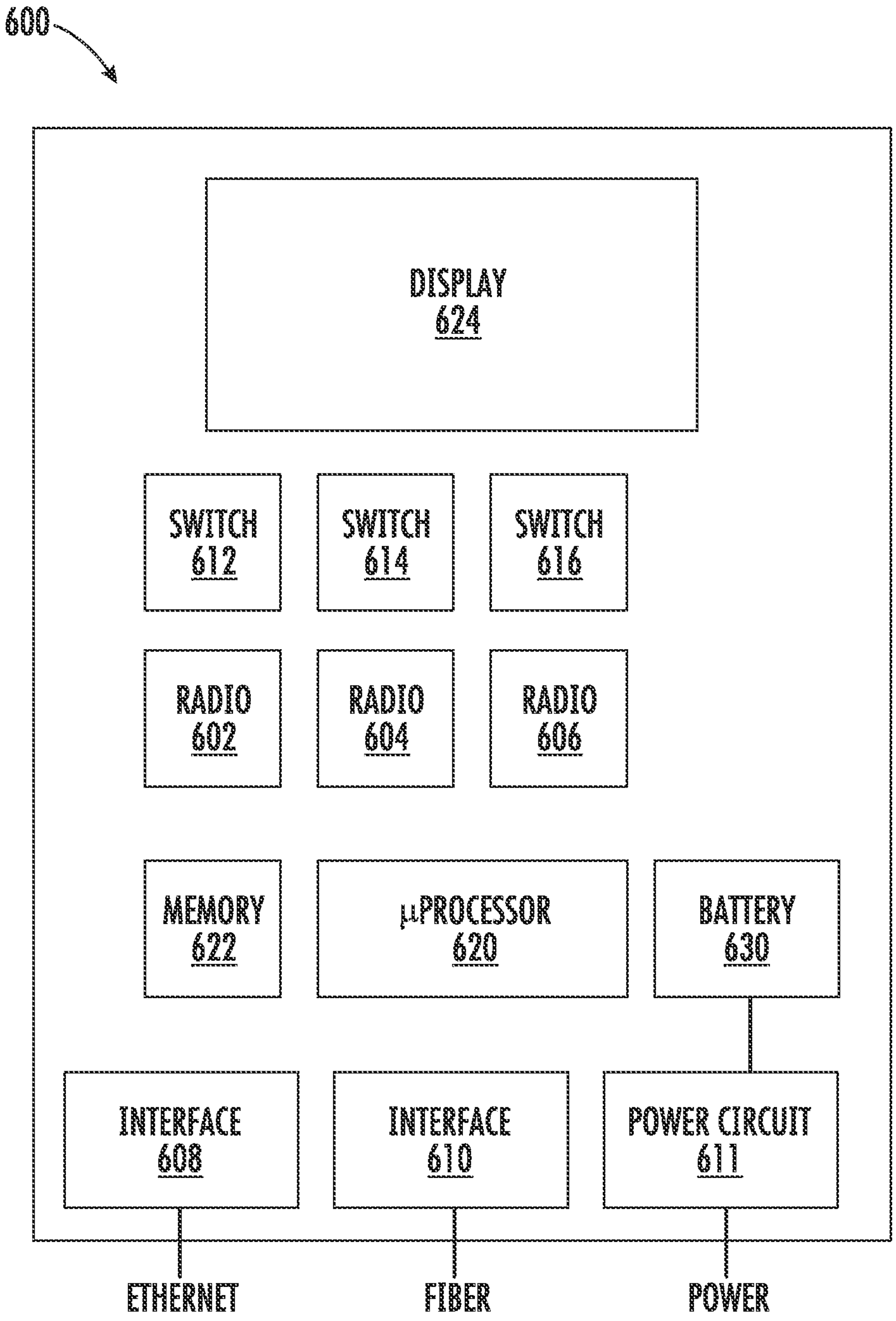
FIG. 13 is a schematic of a communication gateway of the system of FIG. 11.

FIG. 11 shows one alternative example of a fire suppression system 20 at a similar level to FIG. 3. Other details may be drawn from those of the FIG. 1 system. The system includes communication gateway 600, which is used to collect, store and transmit information from monitor modules to different receivers illustrated in FIG. 12. Example receivers include hand held device 400 and remote monitoring station 800. The information may also be stored on a cloud storage 700 or any other suitable local or remote data server. This data server may be used to transmit suppression system information to mobile device(s) or remote monitoring station. The communication gateway contains one or more radios 602, 604, 606 (FIG. 13) to receive signals from monitor modules for example by Bluetooth protocol and to further transmit these signals to mobile phone for example by Bluetooth protocol and to cloud storage via for example Wi-Fi protocol or cellular protocol. Similarly, the communication gateway contains one or more interfaces 608 and 610 wired via Ethernet or fiber optic cables to remote monitoring or cloud storage. The different radios may be enabled on and off by s one or more witches 612, 614, 616 (e.g., DIP switches under a locked cover). The communication gateway also contains microprocessor 620 to control operation of the radios and interfaces, to store suppression system status in memory 622, and drive internal display 624. The communication gateway is preferentially externally powered (e.g., connected to AC power), but may also contain internal battery 630 connected to the power circuit 611 (e.g., having transistor or relay switches to switch between external power and battery) to allow operation during power interruption.

Figure 14:
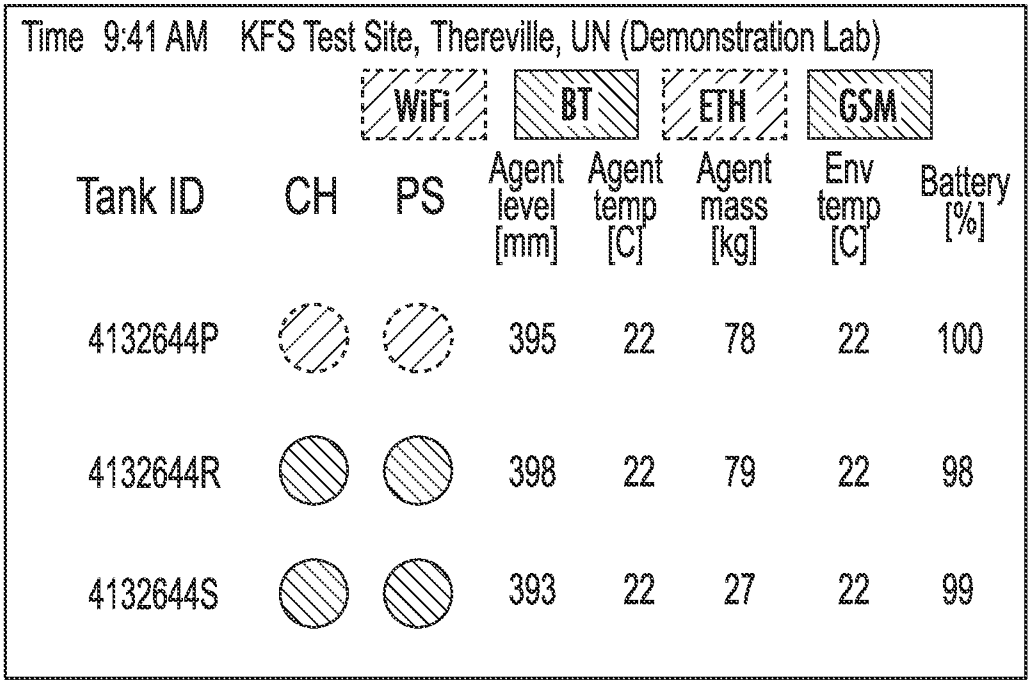
FIG. 14 is a screenshot of a user interface displayed on the communication gateway.

FIG. 14 shows exemplary suppression system information displayed by the communication gateway through its build-in display. Also shown is the status of different radios and interfaces; as above, this information may be displayed through auditory or visual signs, textually, graphically, or in a combinations of these.

Figure 15:
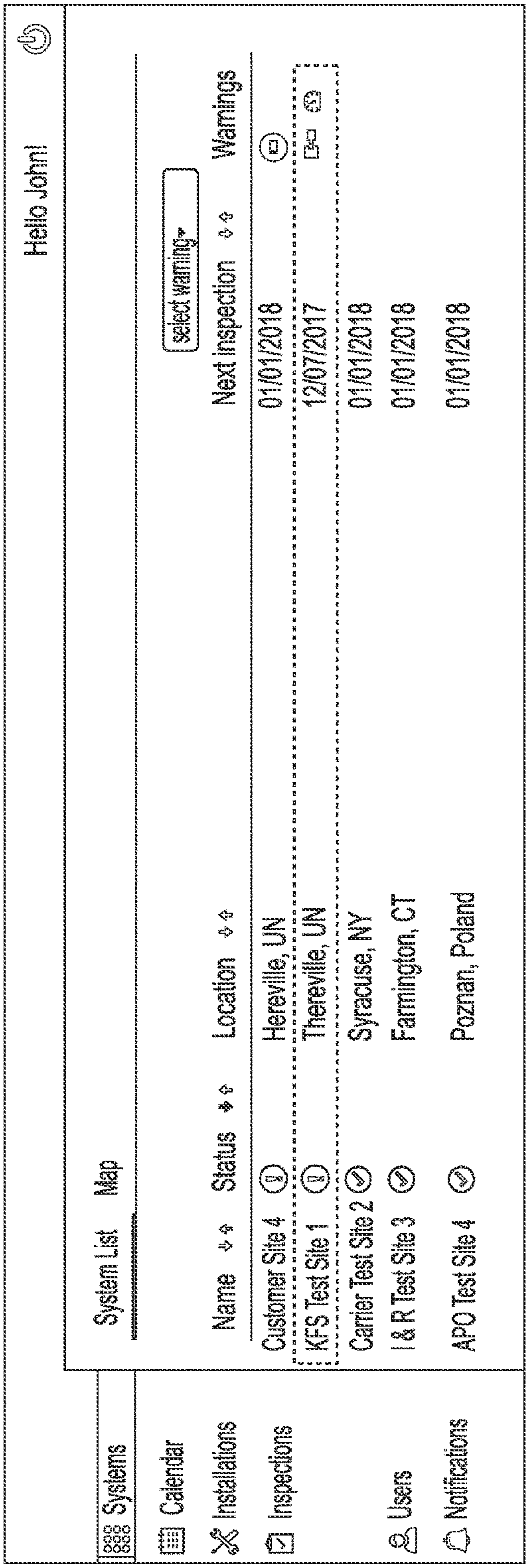
FIGS. 15 and 16 are screenshots of a user interface on a computer or a web application in the system of FIG. 11.
Figure 16:
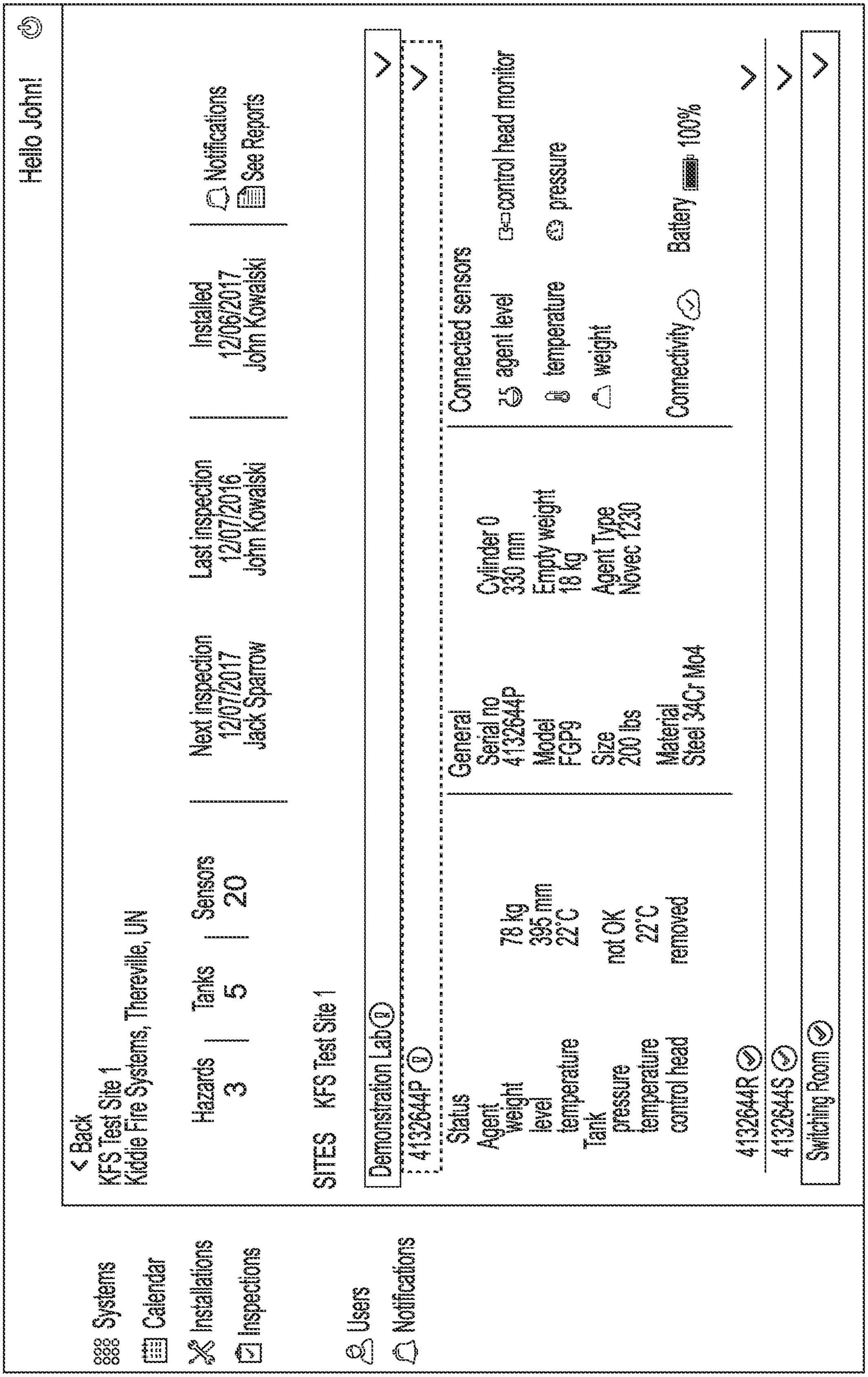

FIGS. 15 and 16 show screenshots of a user interface displayed on a computer screen or a web application (e.g., at the remote monitoring location 800). The suppression system information is displayed in a manner analogous to that shown with the mobile application in FIG. 8-10. Specifically, FIG. 15 overviews the different suppression systems accessible to the technician together with their status information. For example, a checkmark within a green circle represents "system normal" status, while an exclamation mark within a red circle represents "supervisory fault" status (e.g., agent level too low, tank pressure too low, control head(s) disconnected, sensor battery discharged, and/or sensor connectivity loss). Selecting any one of the overviewed systems results in displaying more detailed information (FIG. 16) including status information of all the associated suppression tank units. Further selection of the particular tank unit results in displaying detailed status information pertaining to that tank unit including sensor data, sensor connectivity, and sensor battery level(s) and pinpoints specific fault(s) if present.

Figure 17:
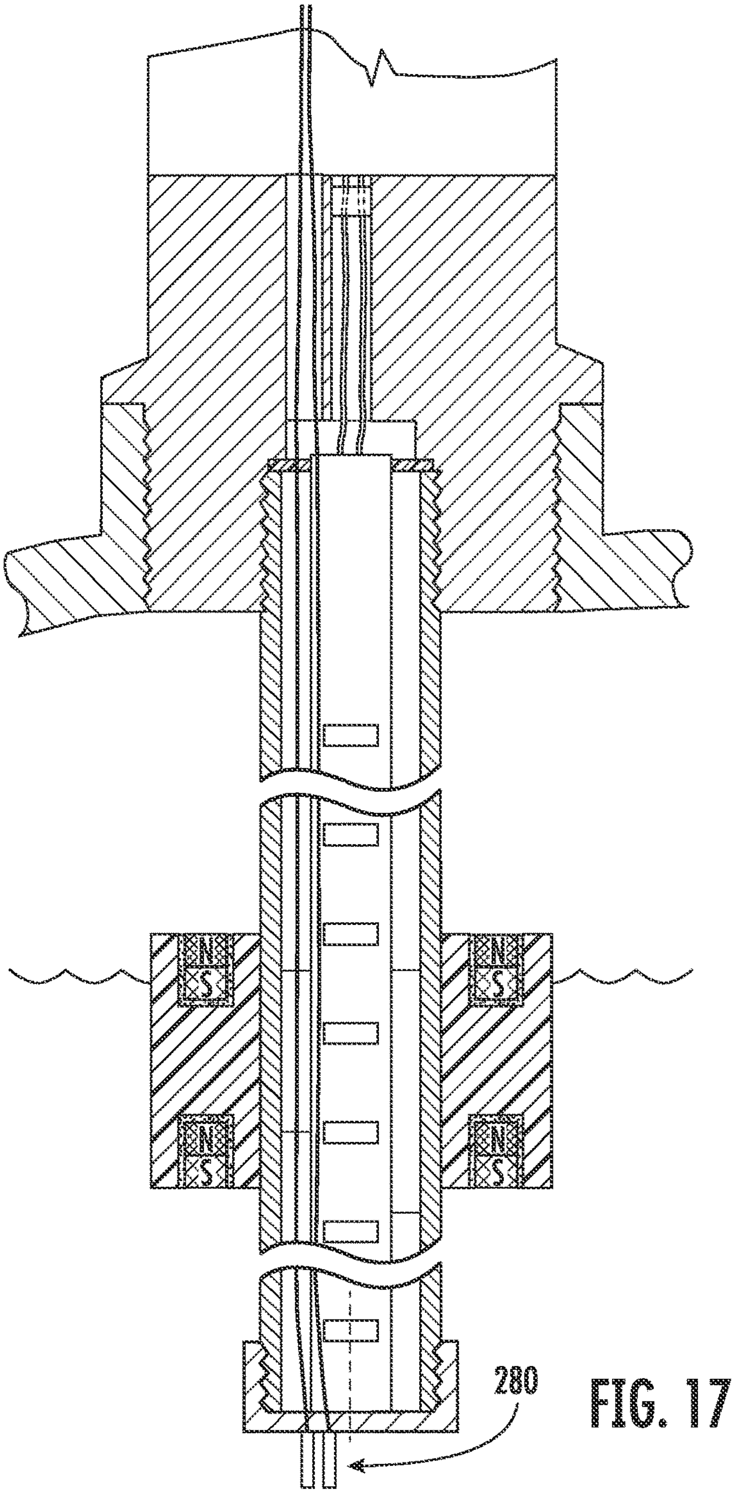
FIG. 17 is a vertical cutaway view of an alternate liquid level sensor with quality sensor.
Figure 18:
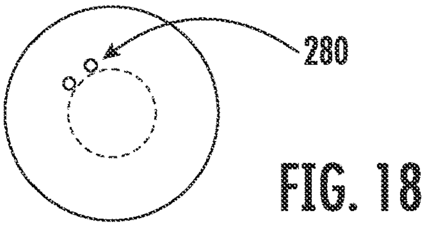
FIG. 18 is a view of a bottom of the alternate liquid level sensor with quality sensor.

As a further variation in cases with liquid suppressant, further aspects of suppressant condition may be monitored. For example, in FIG. 3A, cylinder 34 may contain a liquid suppressant such as water. When activated for discharge, cylinder 36 containing the driver gas would drive water instead of clean agent through the system, and the twin-fluid mixture atomizes to form a water mist that is injected at the nozzles 30. In this case, the water quality in cylinder 34 may be monitored for pre-cursors to corrosion with sensors (e.g., water conductivity through capacitance, water turbidity via an LED/photodiode system) that may be integrated with the liquid level sensor 260. FIGS. 17 and 18 show a capacitance sensor 280 (e.g., a capacitor where the liquid in the tank is between the two poles (shown as rods, although plates or other configurations are possible)) at the lower end of a tube of the liquid level sensor. The exemplary liquid level sensor has a magnetic switch array in the tube interfacing with a magnetic float (see U.S. patent applications 62/773,272 "Magnetic Trap Suppression Tank Level Sensor" and 62/773,286 "Adaptable Suppression Tank Level Sensor", both of Piech et al. and filed Nov. 30, 2018, the disclosures of which are incorporated by reference in their entireties herein as if set forth at length. The exemplary sensor leads pass through the tube. For an aqueous liquid, the module 340 may be pre-programmed with limit parameters on capacitance for particular agent blends. The particular blend may be selected in the factory or system installation. The module may periodically compare measured capacitance to the limit parameters to assess quality and determine a fault condition if out of limit. The module may communicate the fault condition as discussed for other faults and parameters and sensors herein.

Figure 6:
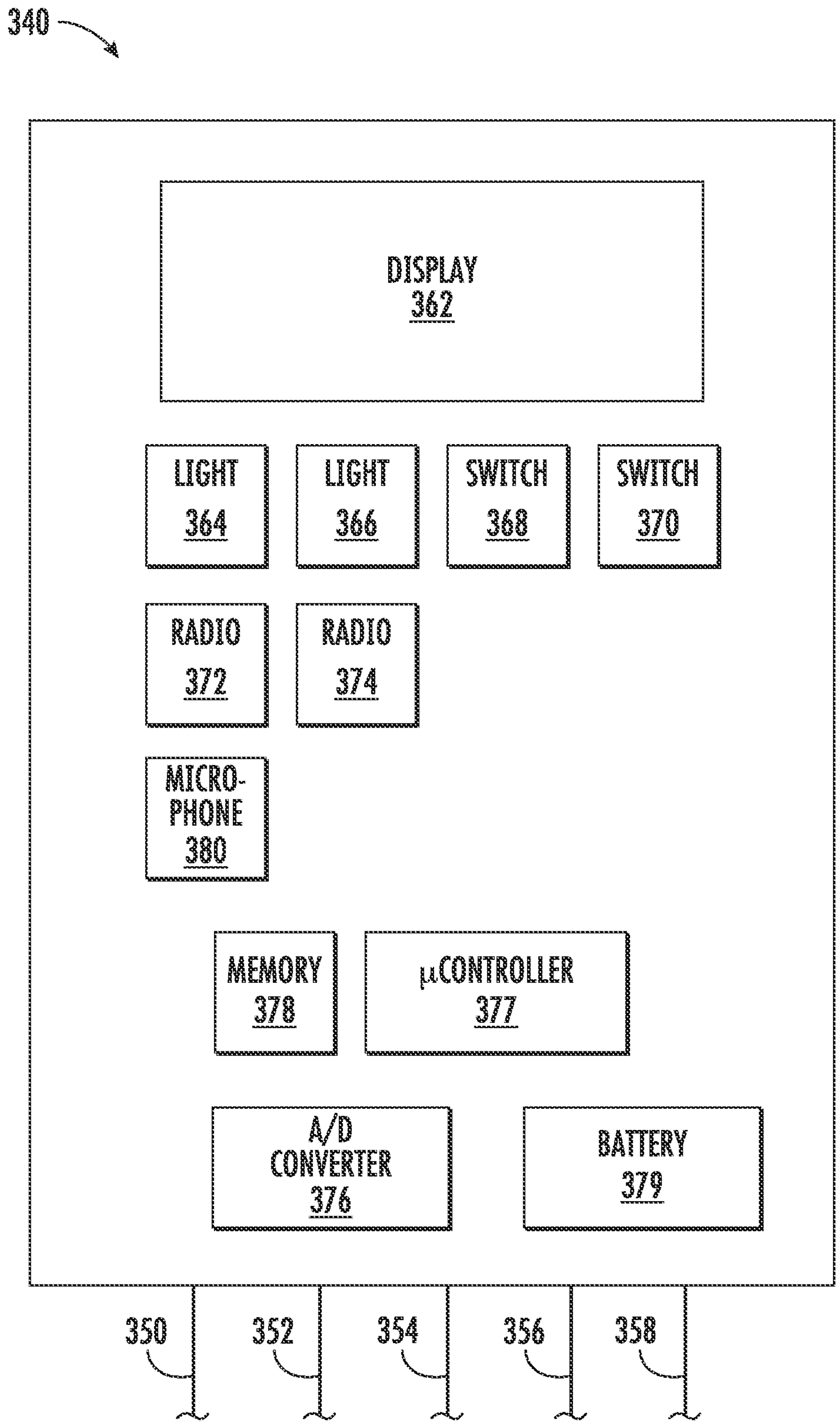
FIG. 6 is a schematic of a monitor module.

Water flow rates may be monitored during the discharge via a mass flow meter 290 (FIG. 3A) (e.g., a paddle wheel, turbine meter) that may be connected in the discharge port of the valve. Gas leakage from cylinder 36 may be monitored for acoustics with a microphone 380 (e.g., embedded in monitor module 340 of FIG. 6). The signals from these sensors would be incorporated into the monitor module 340 as shown in FIG. 6. The module 340 may be pre-programmed with target flow parameters. These parameters may be determined as desired parameters when the system is tailored for a particular site and then verified by on-site testing. The test parameters may then be programmed into the module for in-use comparison. During a discharge, the module 340 compares the measured flow rate to the stored target. The module may store and communicate a fault the actual flow rates fall outside some predetermined range around the nominal target.

The liquid quality sensor and mass flow rate information are sent as inputs 356, 358 alongside 350, 352, 354.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A fire suppression system comprising:
a plurality of tank units (40, 42, 44, 46) each comprising:
a tank body having a first port and an interior for storing at least one of fire suppressant and driver gas;
a discharge assembly mounted to the first port and comprising:
a discharge valve (50, 52); and
a first monitoring switch or sensor (230; 240) configured to monitor a characteristic of the discharge assembly; and
a first monitoring unit (100) coupled to the first monitoring switch or sensor of each said tank unit and configured to communicate with a remote monitoring location (800),
wherein the system further comprises:
for each of the tank units:
a second monitoring switch or sensor (260, 261, 280, 290) configured to monitor a characteristic of each of the tank unit; and
a second monitoring unit (340) coupled to said second monitoring switch or sensor and configured to communicate with the remote monitoring location; and
a gateway (600) in wireless communication with each second monitoring unit and the remote monitoring location, each second monitoring unit configured to communicate with the remote monitoring location only via the gateway and wherein the first monitoring unit configured to communicate directly with the remote monitoring location, wherein the monitoring location receives information relating to the characteristics of the discharge assembly from each of the second monitoring unit via the gateway and information related to the characteristics of each tank unit from the first monitoring unit directly.

2. The system of claim 1 wherein:

the fire suppression unit further comprises a hazard sensor (130); and the first monitoring unit comprises an input from the hazard sensor.

3. The system of claim 2 wherein: the hazard sensor comprises a smoke detector.

4. The system of claim 1 wherein:

the fire suppression system further comprises a pull box (132); and the first monitoring unit comprises an input from the pull box.

5. The system of claim 1 wherein:

the discharge assembly comprises a control head (200); and the first monitoring unit comprises a control output to the control head.

6. The system of claim 1 wherein:

for each of the tank units, the second monitoring switch or sensor comprises a liquid level sensor (260) not connected to the first monitoring unit.

7. The system of claim 1 wherein the second monitoring unit comprises: a radio (372, 374).

8. The system of claim 1 wherein:

the first monitoring switch or sensor is selected from the group consisting of pressure switches or sensors (240) and control head placement switches or sensors (230).

9. The system of claim 1 wherein:

the second monitoring switch or sensor is not coupled to the first monitoring system.

10. The system of claim 1 further comprising:

a hand held device (400) in wireless communication with each second monitoring unit.

11. The system of claim 1 wherein the gateway (600) comprises: memory (622) storing information from the second monitoring units.

12. The system of claim 1 wherein:

the second monitoring units are configured to communicate (421) with each other.

13. The system of claim 12 wherein:

the second monitoring units are configured to communicate (421) with each other via short range wireless communications mesh networking.

14. The system of claim 12 wherein:

the second monitoring units are configured to each store status data from all the second monitoring units so that any of the second monitoring units may communicate said data to a local handheld device.

15. The system of claim 14 wherein:

the second monitoring units are configured to each store said status data from all the second monitoring units at predetermined times; and the second monitoring units are configured so a user of the local handheld device may manually activate said any of the second monitoring units to communicate said data to the local handheld device.

16. The system of claim 1 wherein:

the second monitoring units are configured to wake up from a sleep mode in response to input from the second monitoring switch or sensor or the first monitoring switch or sensor.

17. The system of claim 1 wherein:

the gateway (600) is configured to communicate with the remote monitoring location via Ethernet; and the first monitoring unit configured to communicate with the remote monitoring location via Ethernet.

18. A method for using the fire suppression system of claim 1, the method comprising:

with the first monitoring unit, receiving input from one or more hazard sensors (130) or pull boxes (132); and with each second monitoring unit, communicating status via a radio.

19. The method of claim 18 further comprising:

with the first monitoring unit, controlling suppressant delivery.

20. The method of claim 18 wherein:

said communicating status is to a hand held device (400) via the radio.

21. The method of claim 18 wherein:

the method further comprises each second monitoring unit communicating the status to the remote monitoring location via the gateway.

* * * * *